US009984472B2

(12) United States Patent
Grunberg et al.

(10) Patent No.: US 9,984,472 B2
(45) Date of Patent: May 29, 2018

(54) IMAGE PROCESSING AND MOTION COMPENSATION

(71) Applicants: Daniel B. Grunberg, Lexington, MA (US); Anantharanga Prithviraj, Campell, CA (US); Douglas M. Chin, Windham, MA (US); Peter D. Besen, North Andover, MA (US)

(72) Inventors: Daniel B. Grunberg, Lexington, MA (US); Anantharanga Prithviraj, Campell, CA (US); Douglas M. Chin, Windham, MA (US); Peter D. Besen, North Andover, MA (US)

(73) Assignee: A9.COM, INC., Seattle, WA (US)

( * ) Notice: Subject to any disclaimer, the term of this patent is extended or adjusted under 35 U.S.C. 154(b) by 229 days.

(21) Appl. No.: 14/305,144

(22) Filed: Jun. 16, 2014

(65) Prior Publication Data
US 2015/0139607 A1 May 21, 2015

Related U.S. Application Data

(60) Provisional application No. 61/835,818, filed on Jun. 17, 2013.

(51) Int. Cl.
*H04N 7/18* (2006.01)
*H04N 5/77* (2006.01)
(Continued)

(52) U.S. Cl.
CPC ............ *G06T 7/20* (2013.01); *G06T 7/97* (2017.01); *G11B 31/006* (2013.01); *H04N 5/145* (2013.01);
(Continued)

(58) Field of Classification Search
USPC ................. 386/223–224, 239–248
See application file for complete search history.

(56) References Cited

U.S. PATENT DOCUMENTS

| 5,500,685 A * | 3/1996 | Kokaram | H04N 5/145 348/620 |
| 6,442,203 B1 * | 8/2002 | Demos | H04N 5/145 348/699 |

(Continued)

OTHER PUBLICATIONS

International Search Report, PCT/US2014/42462.

*Primary Examiner* — Hung Dang
(74) *Attorney, Agent, or Firm* — K&L Gates LLP

(57) ABSTRACT

An image processing system receives a sequence of frames including a current input frame and a next input frame (the next input frame is captured subsequent in time with respect to capturing of the current input frame). The image processing system stores a previously outputted output frame. The previously outputted output frame is derived from previously processed input frames in the sequence. The image processing modifies the current input frame based on detected first motion and second motion. The first motion is detected based on an analysis of the current input frame with respect to the next input frame. The second motion is detected based on an analysis of the current input frame with respect to the previously outputted output frame. According to one configuration, the image processing system implements multi-sized analyzer windows to more precisely detect the first motion and second motion.

19 Claims, 22 Drawing Sheets

(51) Int. Cl.
    *H04N 5/775*    (2006.01)
    *G06T 7/20*     (2017.01)
    *H04N 5/357*    (2011.01)
    *G11B 31/00*    (2006.01)
    *H04N 5/14*     (2006.01)
    *H04N 9/79*     (2006.01)
    *H04N 5/217*    (2011.01)
    *G06T 7/00*     (2017.01)

(52) U.S. Cl.
    CPC .............. *H04N 5/217* (2013.01); *H04N 5/357* (2013.01); *H04N 9/7908* (2013.01)

(56) References Cited

U.S. PATENT DOCUMENTS

| | | |
|---|---|---|
| 2004/0141556 A1 | 7/2004 | Rault et al. |
| 2007/0046666 A1* | 3/2007 | Kokojima ............... G06T 15/50 345/427 |
| 2007/0076796 A1 | 4/2007 | Shi et al. |
| 2010/0104203 A1 | 4/2010 | Garakani et al. |
| 2013/0148033 A1* | 6/2013 | Shintani .................. H04N 5/57 348/734 |

\* cited by examiner

FIG. 5

EXAMPLE #1 FOR LARGE ANALYZER WINDOW:

| | Y1+4 | Y1+3 | Y1+2 | Y1+1 | Y1 | Y1-1 | Y1-2 | Y1-3 | Y1-4 |
|---|---|---|---|---|---|---|---|---|---|
| X1+4 | 93 (+4,+4) | 91 | 98 | 88 | 91 | 93 | 95 | 97 | 98 (-3,-2) |
| X1+3 | 85 | 85 (+3,+3) | 85 | 81 | 85 | 89 | 92 | 94 (-3,-3) | 99 |
| X1+2 | 85 | 79 | 79 (+2,+2) | 78 | 86 | 85 | 89 (-3,-4) | 93 | 98 |
| X1+1 | 86 | 77 | 77 | 75 (+1,+1) | 83 | 85 (-3,-4) | 89 | 88 | 95 |
| X1 | 85 | 73 | 75 | 74 | 85 (0,0) | 85 | 88 | 91 | 92 |
| X1-1 | 85 | 72 | 73 | 72 (-1,+1) | 74 | 76 (-1,1) | 76 | 82 | 92 |
| X1-2 | 75 | 65 | 58 (-2,+2) | 66 | 73 | 73 | 75 (-2,-2) | 86 | 97 |
| X1-3 | 77 | 69 (-3,+3) | 68 | 69 | 68 | 72 | 75 | 88 (-3,-3) | 91 |
| X1-4 | 82 (-4,+4) | 74 | 71 | 76 | 85 | 86 | 82 | 81 | 95 (-4,-4) |

CORRELATION RESULTS 360-1

EXAMPLE #1
FOR SMALL
ANALYZER
WINDOW:

| | Y1+4 | Y1+3 | Y1+2 | Y1+1 | Y1 | Y1-1 | Y1-2 | Y1-3 | Y1-4 |
|---|---|---|---|---|---|---|---|---|---|
| X1+4 | 30 (+4,+4) | 28 | 29 | 27 | 27 | 28 | 27 | 28 | 28 (-3,-2) |
| X1+3 | 28 | 25 (+3,+3) | 24 | 25 | 26 | 24 | 26 | 26 (-3,-3) | 27 |
| X1+2 | 26 | 22 | 21 (+2,+2) | 22 | 24 | 23 | 25 (-3,-4) | 26 | 27 |
| X1+1 | 25 | 20 | 19 | 21 (+1,+1) | 22 | 22 (-3,-4) | 23 | 22 | 23 |
| X1 | 25 | 19 | 18 | 20 | 23 (0,0) | 23 | 24 | 24 | 24 |
| X1-1 | 24 | 17 | 13 | 18 (-1,+1) | 20 | 21 (-1,1) | 20 | 23 | 25 |
| X1-2 | 23 | 14 | ⓘ11 (-2,+2) | 15 | 16 | 18 | 21 (-2,-2) | 23 | 24 |
| X1-3 | 19 | 16 (-3,+3) | 15 | 17 | 17 | 18 | 19 | 20 (-3,-3) | 24 |
| X1-4 | 21 (-4,+4) | 18 | 17 | 18 | 19 | 19 | 20 | 22 | 23 (-4,-4) |

CORRELATION
RESULTS
360-2

|  | Y1+4 | Y1+3 | Y1+2 | Y1+1 | Y1 | Y1-1 | Y1-2 | Y1-3 | Y1-4 |
|---|---|---|---|---|---|---|---|---|---|
| X1+4 | 30 (+4,+4) | 28 | 29 | 27 | 27 | 28 | 27 | 28 | 28 (-3,-2) |
| X1+3 | 28 | 25 (+3,+3) | 24 | 25 | 26 | 24 | 26 | 26 (-3,-3) | 27 |
| X1+2 | 26 | 22 | 21 (+2,+2) | 22 | 24 | 23 | 25 | 26 (-3,-4) | 27 |
| X1+1 | 25 | 20 | 19 | 21 (+1,+1) | 22 | 22 (-3,-4) | 23 | 22 | 23 |
| X1 | 25 | 19 | 18 | 20 | 23 (0,0) | 23 | 24 | 24 | 24 |
| X1-1 | 24 | 17 | 13 | 18 (-1,+1) | 20 | 21 (-1,-1) | 20 | 23 | 25 |
| X1-2 | 23 | 14 | (11) (-2,+2) | 15 | 16 | 18 | 21 (-2,-2) | 23 | 24 |
| X1-3 | 19 | 16 (-3,+3) | 15 | 17 | 17 | 18 | 19 | 20 (-3,-3) | 24 |
| X1-4 | 21 (-4,+4) | 18 | 17 | 18 | 19 | 19 | 20 | 22 | 23 (-4,-4) |

EXAMPLE #2
FOR SMALL
ANALYZER
WINDOW:

CORRELATION
RESULTS
360-2

EXAMPLE #3 FOR SMALL ANALYZER WINDOW:

| | Y1+4 | Y1+3 | Y1+2 | Y1+1 | Y1 | Y1-1 | Y1-2 | Y1-3 | Y1-4 |
|---|---|---|---|---|---|---|---|---|---|
| X1+4 | 21 (-4,+4) | 19 | 26 | 25 | 25 | 24 | 23 | 28 | 30 (+4,+4) |
| X1+3 | 18 | 16 (-3,+3) | 22 | 20 | 19 | 17 | 14 | 25 (+3,+3) | 28 |
| X1+2 | 17 | 15 | 21 (+2,+2) | 19 | 18 | 13 | 11 (-2,+2) | 24 | 29 |
| X1+1 | 18 | 17 | 22 | 16 (+1,+1) | 14 | 12 (-1,+1) | 13 | 25 | 27 |
| X1 | 19 | 17 | 24 | 18 | (12) (0,0) | 13 | 16 | 26 | 27 |
| X1-1 | 19 | 18 | 23 | 17 (-3,-4) | 16 | 15 (-1,-1) | 18 | 24 | 28 |
| X1-2 | 20 | 19 | 25 (-3,-4) | 23 | 24 | 20 | 21 (-2,-2) | 26 | 27 |
| X1-3 | 22 | 20 | 26 | 22 | 24 | 23 | 23 | 26 (-3,-3) | 28 |
| X1-4 | 23 (-4,-4) | 24 | 27 | 23 | 24 | 25 | 24 | 27 | 28 (-3,-2) |

CORRELATION RESULTS 360-2

FIG. 10

| CONFIDENCE VALUE ASS'D WITH MV GENERATED FOR NEXT/CURR FRAME | CONFIDENCE VALUE ASS'D WITH MV GENERATED FOR CURR/LAST OUTPUT FRAME | WEIGHT W1 | WEIGHT W2 | WEIGHT W3 | TOTAL |
|---|---|---|---|---|---|
| LOW | LOW | 0 | 1 | 0 | 1 |
| LOW | HIGH | 0 | 7/16 | 9/16 | 1 |
| HIGH | LOW | 1/2 | 1/2 | 0 | 1 |
| HIGH | HIGH | 7/32 | 7/32 | 18/32 | 1 |

FIG. 12

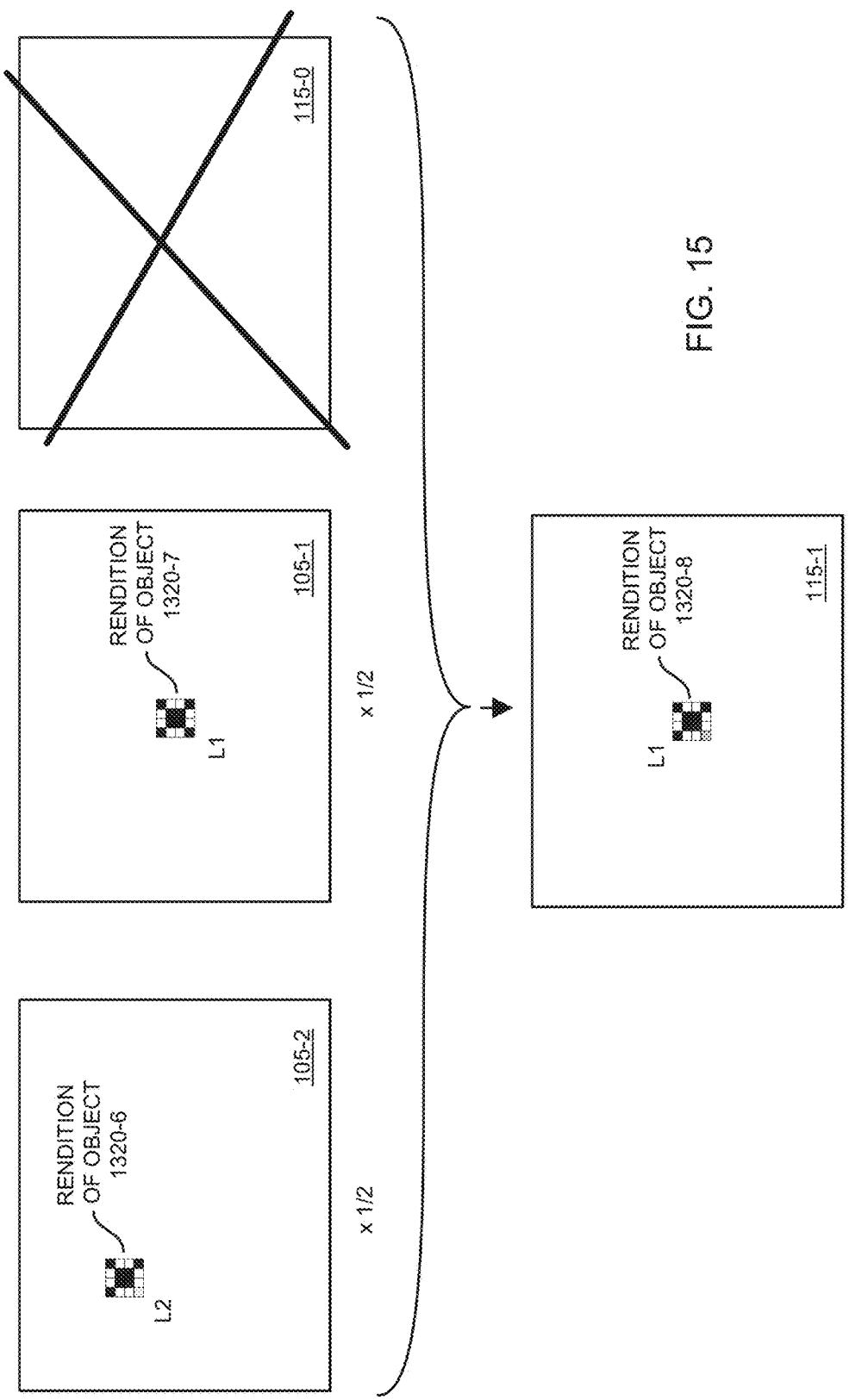

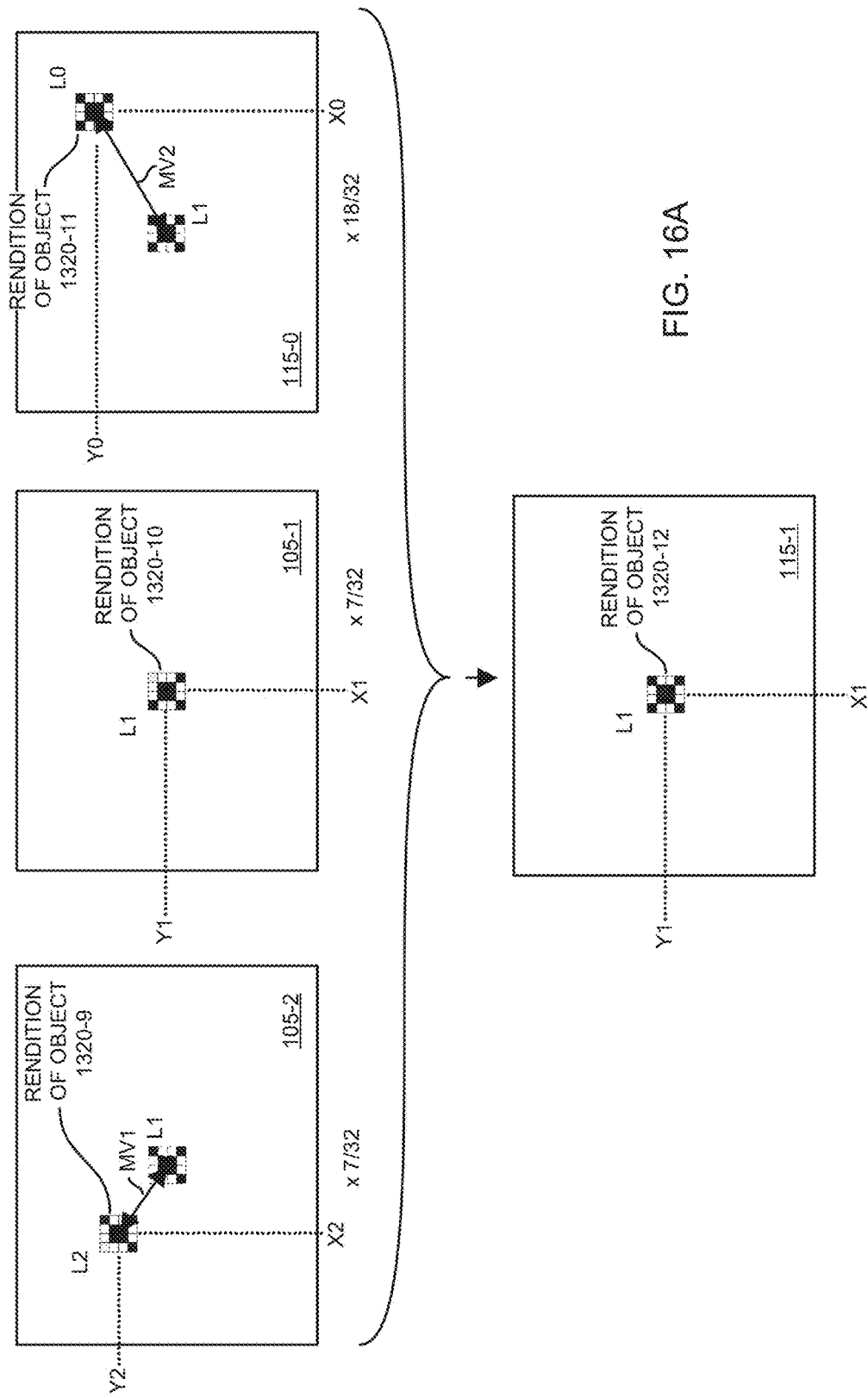

IMAGE PROCESSING AND MOTION COMPENSATION

RELATED APPLICATIONS

This application is related to and claims the benefit of earlier filed U.S. Provisional Patent Application Ser. No. 61/835,818 entitled "Improved Motion Compensated Temporal Noise Filter for Video," filed on Jun. 17, 2013, the entire teachings of which are incorporated herein by this reference.

BACKGROUND

Image sensor chips have long been used on computers devices to obtain images of objects in a surrounding area. Typically, the image sensors are mounted on the front and/or rear facing of the computer device to capture images either in front of a respective computer or in back of the computer device.

In general, a respective image sensor chip includes multiple sensor cells. Each sensor cell corresponds to a pixel on a display screen. When light strikes the image sensor chip, each cell in the image sensor chip receives a respective amount of light depending on the image being sensed. In accordance with the received light, the cells charge. The image sensor chip converts the detected light to a corresponding voltage representative of the light setting detected by the sensor cell. Image processing circuitry in the camera typically converts the corresponding voltages in the sensor cells into respective digital image information. A combination of the detected light settings in each of the sensor cells represents a respective image for display on a respective display screen.

There has been a movement to reduce the cost and size of respective computer devices. This movement has resulted in use of smaller and lower quality image sensor chips. As the image chip sensors and corresponding cell sizes become smaller, the low light performance results in generation of degraded (low quality) images.

BRIEF DESCRIPTION OF EMBODIMENTS

One or more embodiments herein reduce noise in images captured by image sensor devices.

For example, in accordance with one embodiment, a display management resource applies multistage image processing to received image data to produce a corresponding image for storage or display on a respective display screen. The multistage image processing can include resources such as one or more multi-window motion analyzer resources, motion compensation resources, etc., to enhance image quality.

More specifically, in accordance with one embodiment, the image processing system as described herein receives a sequence of frames including a current input frame and a next input frame. In one embodiment, the next input frame is captured subsequent in time with respect to capturing the current input frame. The sequence of frames can be captured by any suitable resource such as a multi-cell image sensor resource.

The image processing system includes a buffer to store a previously outputted output frame using a resource such as an infinite impulse response filter. Settings of the previously outputted output frame are derived from previously processed input frames in the sequence.

The image processing system modifies the current input frame based on detected first motion and second motion. The image processing system detects the first motion based on an analysis of the current input frame and the next input frame. The image processing system detects the second motion based on an analysis of the current input frame and the previously outputted output frame.

Motion (including zero motion and greater than zero motion) as described herein can be detected in any suitable manner. In one non-limiting example embodiment, the image processing system employs one or more multi-window motion analyzer resources to detect frame-to-frame motion. Each multi-window motion analyzer resource initiates application of any suitable number of different sized windows to detect motion.

In one embodiment, the multi-window motion analyzer resource initiates application of a first-sized analyzer window to correlate a rendition of an object in a first frame of display elements to a corresponding rendition of the same object in a second frame of display elements. Additionally, each multi-window motion analyzer resource initiates application of a second-sized analyzer window to correlate the rendition of the object in the first frame of display elements to the corresponding rendition of the object in the second frame of display elements. The multi-window motion analyzer resource derives motion information for the rendered object depending on correlation results of applying the first-sized analyzer window and the second-sized analyzer window.

In one embodiment, a respective motion analyzer resource selects a best motion vector for an object (region of one or more display elements) based on first window and second window correlation results.

As previously mentioned, the image processing system can include a motion compensation resource. In an example embodiment, the motion compensation resource receives first motion information (such as a one or more motion vectors) generated by a first motion analyzer resource. The first motion information specifies an amount of movement (if any) of a rendered object from a location in the current input frame and a location of the rendered object in the next input frame. The motion compensation resource utilizes the first motion information to identify the amount of movement of the rendered object from the location in the current input frame and the location of the rendered object in the next input frame.

The motion compensation resource additionally receives second motion information (such as one or more motion vectors) generated by a second motion analyzer resource. The second first motion information specifies an amount of movement (if any) of the rendered object from the location in the current input frame and a location of the rendered object in the previously outputted output frame. The motion compensation resource utilizes the second motion information to identify the amount of movement of the rendered object from the location in the current input frame and the location of the rendered object in previously outputted output frame.

In accordance with further embodiments, the motion compensation resource can be configured to receive and analyze confidence information derived for the motion information. The confidence information indicates a degree to which the first motion information and second motion information are accurate. Depending on the confidence information and whether corresponding motion information is accurate, the motion compensation resource produces weight values indicating how to modify settings of a rendered object (corresponding display elements settings) in the current input frame to produce a modified current frame (including the rendered object) for display on a display screen. In one embodiment, based on motion vector information, the image processing system produces a rendering of the object in the current frame based at least in part on settings of the rendered object at locations in the next frame and the current frame as well as based on settings of the rendered object at locations in the previously outputted frame and the current frame to enhance a quality of the rendered object in the current frame.

Modification of the current frame (based on the next input frame and the last outputted frame) can include producing a first weight value, second weight value, a third weight value. The motion compensation resource applies the first weight value to the rendition of the object in the next input frame to produce a first component. The motion compensation resource applies the second weight value to the rendition of the object in the current input frame to produce a second component. The motion compensation resource applies the third weight value to the rendition of the object in the previously outputted frame to produce a third component. In accordance with further embodiments, the motion compensation resource then sums the first component, the second component, and the third component to produce the rendition of the object for inclusion in the modified current input frame.

In accordance with still further embodiments, the motion compensation resource utilizes a location of the rendered object in the current input frame as a location to render a corresponding denoised rendition of the object in the modified current input frame. In one embodiment, the modified current output frame is outputted for display on a display screen.

Embodiments herein are useful over conventional techniques because techniques (such as reducing image noise associated with renditions of moving or non-moving objects) as described herein provide a viewer with a more accurate and/or more realistic viewing experience.

These and other more specific embodiments are disclosed in more detail below.

Note that any of the resources as discussed herein can include one or more computerized devices, mobile devices, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the steps and operations summarized above and disclosed in detail below. One such embodiment comprises a computer program product including a non-transitory computer-readable storage medium (i.e., any physical computer readable hardware storage medium) on which software instructions are encoded for subsequent execution. The instructions, when executed in a computerized device (e.g., computer processing hardware) having a processor, program and/or cause the processor to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, etc., or other a medium such as firmware in one or more ROM, RAM, PROM, etc., or as an Application Specific Integrated Circuit (ASIC) such as ASIC logic, etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One or more embodiments herein include a computer readable storage medium and/or system having instructions stored thereon. The instructions, when executed by computer processor hardware, cause the computer processor hardware (such as in a mobile computer device) to: apply a first-sized analyzer window to correlate a rendition of an object in a first frame of display elements to a rendition of the object in a second frame of display elements; apply a second-sized analyzer window to correlate the rendition of the object in the first frame of display elements to a rendition of the object in the second frame of display elements; and derive motion vector information for the rendered object depending on results of applying the first-sized analyzer window and the second-sized analyzer window.

One or more embodiments herein include a computer readable storage medium and/or system having instructions stored thereon. The instructions, when executed by computer processor hardware, cause the computer processor hardware (such as in a security system) to: receive a sequence of frames including a current input frame and a next input frame, the next input frame captured in time subsequent to the current input frame in the sequence; store a previously outputted output frame, the previously outputted output frame derived from previously processed input frames in the sequence; and modify the current input frame based on first motion and second motion, the first motion detected based on an analysis of the current input frame and the next input frame, the second motion detected based on an analysis of the current input frame and the previously outputted output frame.

The ordering of the operations above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor, or within an operating system or a within a software application.

As discussed herein, techniques herein are well suited for facilitating installation of corresponding wireless access points in a network environment. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

FIG. 5 is an example diagram illustrating correlation results derived from using a large analyzer window according to embodiments herein.

FIG. 6 is an example diagram illustrating correlation results derived from using a small analyzer window according to embodiments herein.

FIG. 8 is an example diagram illustrating correlation results derived from using a small analyzer window according to embodiments herein.

FIG. 10 is an example diagram illustrating correlation results derived from using a small analyzer window according to embodiments herein.

FIG. 12 is an example diagram illustrating generation of weight values according to embodiments herein.

FIG. 15 is an example diagram illustrating generation of a third set of weight values according to embodiments herein.

FIGS. 16A and 16B are example diagrams illustrating generation of a fourth set of weight values according to embodiments herein.

Figure 1:
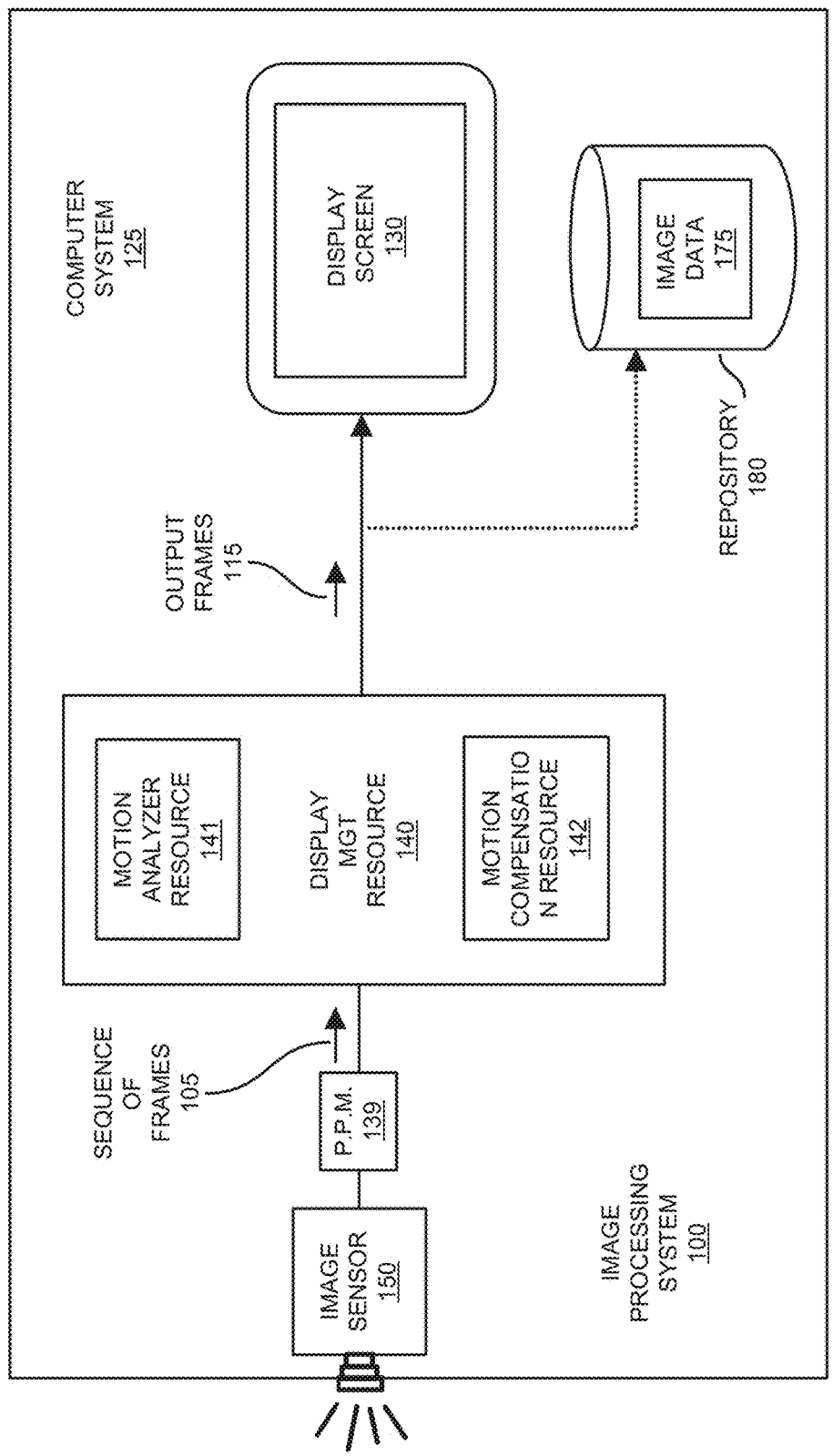
FIG. 1 is an example diagram illustrating an image processing system according to embodiments herein.

The foregoing and other objects, features, and advantages of embodiments herein will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION AND FURTHER SUMMARY OF EMBODIMENTS

FIG. 1 is an example diagram illustrating an image processing system configured to execute operations according to embodiments herein.

As shown, image processing system 100 includes computer system 125. Computer system 125 includes image sensor 150, display management resource 140, display screen 130, and repository 180.

Image sensor 150 includes any suitable number of multiple sensor cells. During operation, image sensor 150 (including the array of sensor cells) captures a respective image at each sample time and produces the corresponding sequence of frames 105 (such as video).

In one non-limiting example embodiment, each of multiple sensor cells in the image sensor 150 indicates the setting of a corresponding display element of a field of display elements to be displayed on display screen 130. In accordance with further embodiments, there is not a one-to-one correlation between a sensor cell in the image sensor 150 and a respective display element on the display screen 130. In this latter instance, the display management resource 140 can be configured to convert the resolution of the received sequence of frames to an appropriate resolution for display on display screen 130.

The sequence of frames 105 produced by image sensor 150 can be noisy. In other words, image sensor 150 may be a relatively low-quality image detection device. Settings for certain display elements in a given sample frame may not accurately capture corresponding portions of a respective image.

During operation, as described herein, display management resource 140 applies processing to the received sequence of frames 105 to produce higher-quality output images. For example, display management resource 140 receives the (potentially poor quality) sequence of input frames 105 produced by image sensor 150. Display management resource 140 includes motion analyzer resource 141 and motion compensation resource 142 to produce corresponding output frames 115, motion analyzer resource 141 analyzes motion with respect to rendered objects in the received sequence of frames 105. Based on detected motion, motion compensation resource 142 facilitates conversion of the input sequence of frames 105 into higher-quality output frames 115.

As an example, the portion of an image detected by a respective sensor cell in the image sensor 150 may be black. Due to noise, the sensor cell might produce an output indicating that the corresponding location was detected as being white. In accordance with another illustrative example, a respective sensor cell may be read out as an incorrect value of 770 (based on a possible range from 0 to 1023). Assume that the setting should be 700 instead of 770. Display element settings for the same object (in which the setting of a display element is incorrect) may be detected as being 700 in a last output frame and/or next input frame. As discussed herein, the incorrect setting of 770 is corrected via use of other display element settings of the moving object that are correct. As further discussed herein, the display management resource 140 and corresponding functionality provided by motion analyzer resource 141 and motion compensation resource 142 can be configured to substantially correct the setting for the display element to be nearer to black than white.

As further shown, computer system 125 can include display screen 130 to play back received output frames 115. Additionally or alternatively, computer system 125 can include repository 180 to store the output frames 115 as image data 175. Note that embodiments herein can include transmitting the generated output frames over a respective network to a target device.

Figure 2:
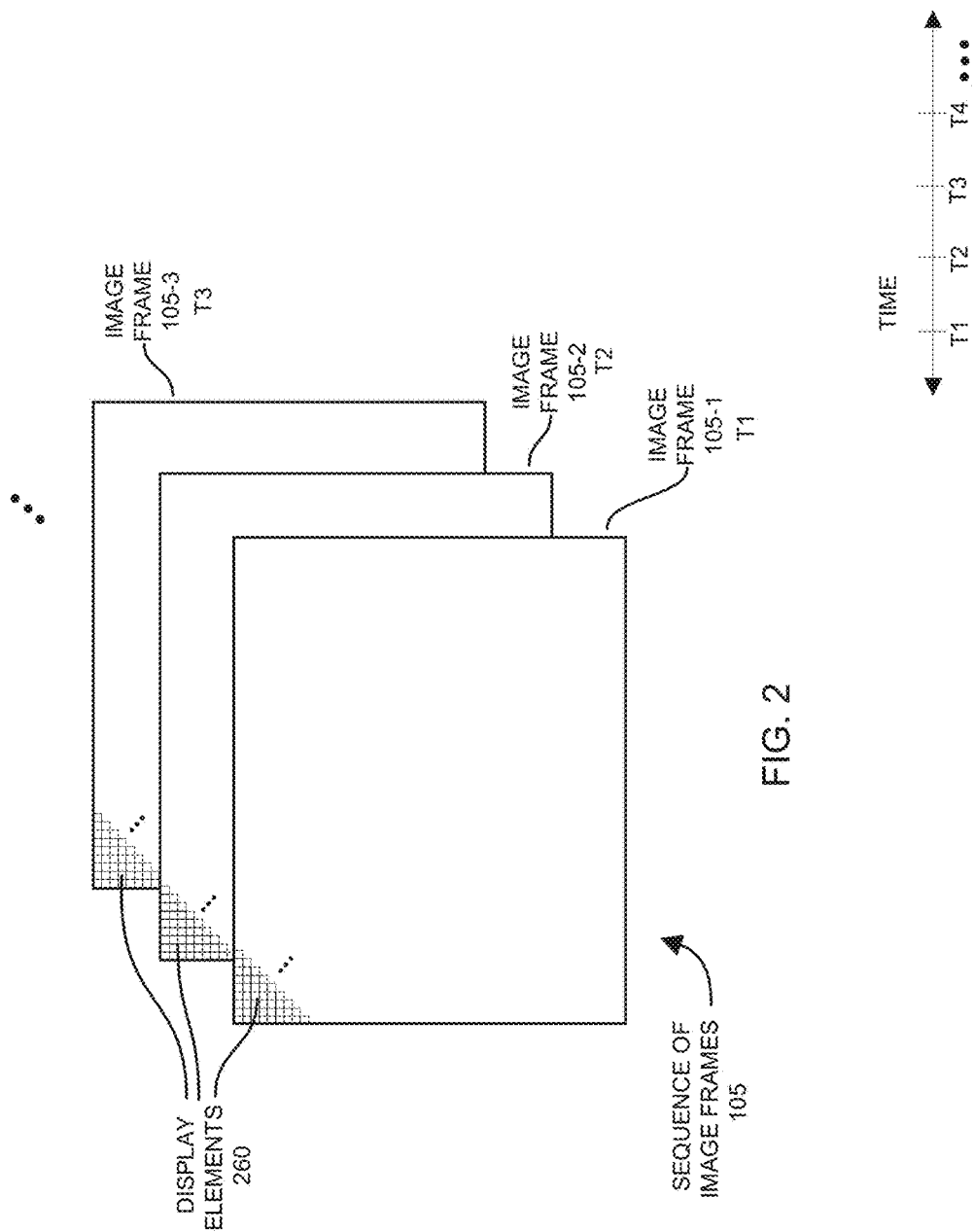
FIG. 2 is an example diagram illustrating a sequence of captured image frames according to embodiments herein.

FIG. 2 is an example diagram illustrating a sequence of image frames according to embodiments herein.

In one embodiment, as previously mentioned, the sequence of frames 105 can represents video data. For example; at sample time T1, image sensor 150 produces image frame 105-1; at sample time T2, image sensor 150 produces image frame 105-2; at sample time T3, image sensor produces image frame 105-3; and so on. As yet shown and as previously discussed, each of the image frames 105 can be configured to specify settings associated with corresponding display elements 260. Setting can be based on any suitable standard such as RGB, YUV, etc.

Figure 3:
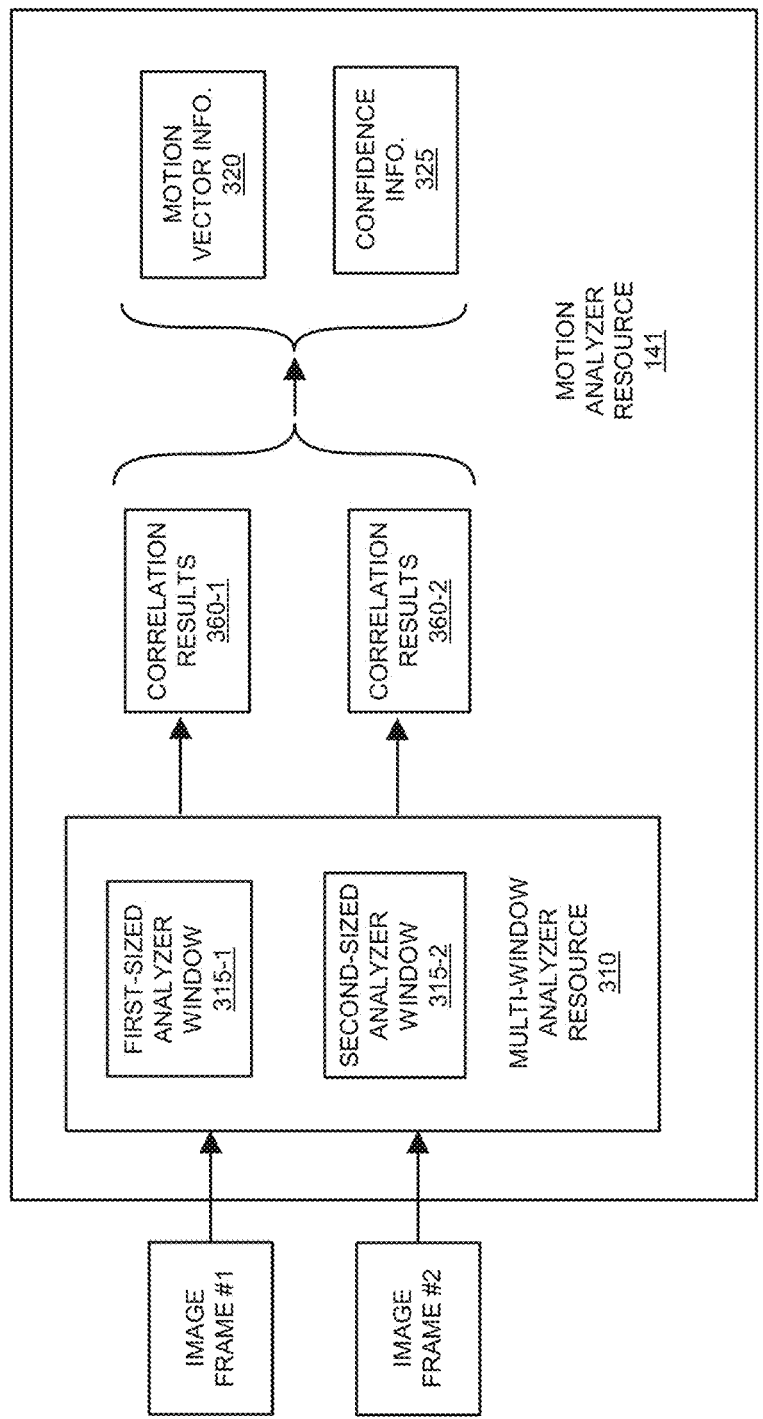
FIG. 3 is an example diagram of a motion analyzer resource according to embodiments herein.

FIG. 3 is an example diagram of a motion analyzer resource according to embodiments herein.

In one embodiment, motion analyzer resource 141 includes a multi-window analyzer resource 310. Multi-window analyzer resource 310 can include any number of analyzer windows. In this example embodiment, multi-window analyzer resource 310 includes first sized analyzer window 315-1 and second sized analyzer window 315-2.

During operation, motion analyzer resource 141 analyzes one or more received image frames such as image frame #1 and image frame #2 and produces corresponding motion vector information 320 indicating regions in the image frame #1 and image frame #2 that represent the same rendered objects (i.e., items). In one embodiment, the motion vector information 320 indicates a degree of movement of each respective rendered object present in the image frame #1 and image frame #2.

By further way of non-limiting example embodiment, note that the motion analyzer resource 141 can also generate confidence information 325 indicating a corresponding degree to which the motion vector information 320 is believed to be accurate.

In furtherance of generating motion vector information 320, the multi-window analyzer resource 310 applies first sized window analyzer window 315-1 to received images (image frame #1 and image frame #2) to produce corresponding correlation results 360-1. As further described herein, in a similar manner, but using a different size window, namely second sized analyzer window 350-2, the multi-window analyzer resource 310 applies the second sized analyzer window 315-2 to received images (image frame #1 and image frame #2) to produce corresponding correlation results 360-2.

As a more specific example, the multi-window analyzer resource 310 applies first-sized analyzer window 315-1 to received image frames to correlate a selected set of display elements representing a rendition of an object in frame #1 to a corresponding set of display elements in frame #2 representing the rendition of the object. The multi-window analyzer resource 310 applies second-sized analyzer window 315-2 to correlate the rendition of the object in frame #1 to a rendition of the object in the frame #2. Multi-window analyzer resource 310 derives motion vector information 320 for the rendered object depending on results of applying the first-sized analyzer window 315-1 and the second-sized analyzer window 315-2 to frame #1 and frame #2.

As discussed and shown in the following figures, the first-sized analyzer window 315-1 can be sized to analyze a first number of display elements; the second-sized analyzer window 315-2 can be sized to analyze a second number of display elements. The total number of display elements in the second sized analyzer window 315-2 can be substantially less than the total number of display elements in the first sized analyzer window 315-1.

Even though they are of different settings, each of the analyzer windows 315 can be any suitable size. In one non-limiting example embodiment, the first sized analyzer window 315-1 is sized to be a matrix of 24×24 display elements (e.g., a region of 576 display elements). The second size analyzer window 315-2 is sized to be a matrix of 12×12 display elements (e.g., a region of 144 display elements).

Figure 4:
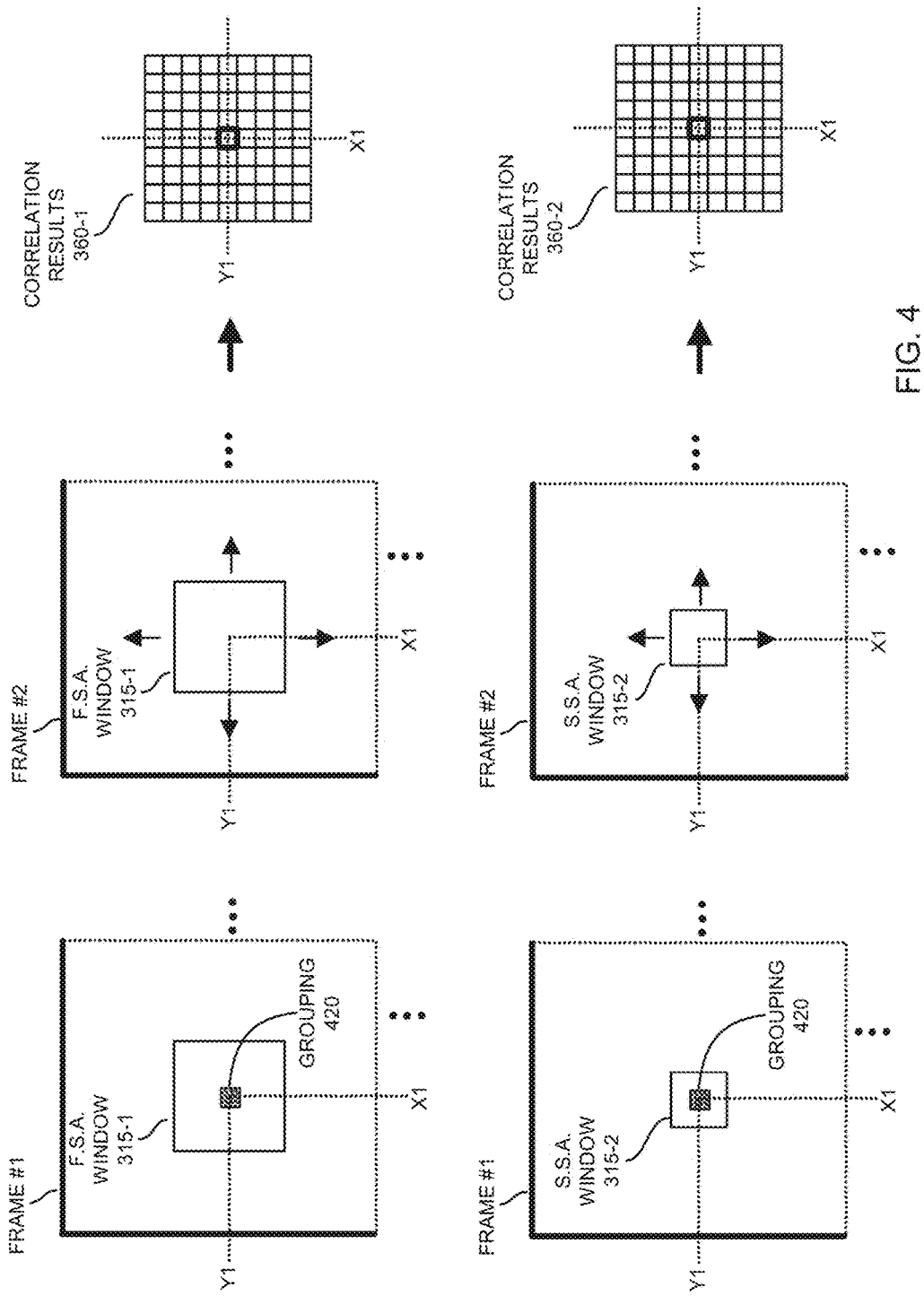
FIG. 4 is an example diagram illustrating application of multi-sized analyzer windows to detect motion according to embodiments herein.

FIG. 4 is an example diagram illustrating application of multi-sized windows to detect motion according to embodiments herein.

As further shown in this example embodiment, the motion analyzer resource 141 analyzes frame #1 and frame #2 to identify renditions of the same rendered object and a degree of movement from one frame to another. This includes mapping groupings of one or more display elements in frame #1 to a corresponding grouping 420 of one or more display elements in frame #2.

In this example, assume that the motion analyzer resource 141 selects the group of one or more display elements at location X1 and Y1 in frame #1 for analysis. As further discussed herein, the motion analyzer resource 141 repeats this process for each of the different groupings of display elements in frame #1 to produce and mapping of rendered objects in frame #1 to location coordinates of the same rendered objects in frame #2.

Further in this example embodiment, for the selected location under test of one or more display elements at location coordinates (X1, Y1), the motion analyzer resource 141 attempts to find a location of a substantially best match of a corresponding grouping of one or more display elements in frame #2 representative of the same rendered object.

As previously discussed, in one non-limiting example embodiment, the first sized analyzer window 315-1 is sized to be a matrix such as 24×24 display elements. The second size analyzer window 315-2 is sized to be a matrix such as 12×12 display elements.

As previously discussed, the grouping under test at location coordinates (X1, Y1) can be a single display element or multiple to display elements. As an example, in one non-limiting example embodiment, the grouping 420 can represent a 4×4 matrix of display elements (16) of interest. In such an instance, the rendition of the object (such as 16 display elements in grouping 420) is defined by substantially fewer display elements (16 display elements) than a number of display elements (24×24=576) captured by the first-sized analyzer window. Additionally, the rendition of the object (grouping 420 such as 16 display elements) is defined by substantially fewer display elements (16) than a number of display elements (144) as captured by the second-sized analyzer window.

To determine motion from one frame to the next for the grouping of display elements 420, the motion analyzer resource 141 compares settings of display elements in the first sized analyzer window 315-1 to settings of display elements in the first sized analyzer window 315-1 at location X1 and Y1 in frame #2.

In one embodiment, for each possible motion vector, the motion analyzer resource 141 performs a pixel by pixel analysis for display elements within the first sized analyzer window 315-1 in frame #1 and the corresponding display elements in the first sized analyzer window 315-1 in frame #2. For example, the motion analyzer resource 141 can implement a function such as summing of absolute differences (a.k.a., SAD) between the settings of pixels in each window. The more similar the settings are to each other in each of the windows, the motion analyzer resource 141 produces a lower magnitude correlation result. In other words, if the settings of display elements in the first sized analyzer window 315-1 (centered at location X1 and Y1) of frame #1 are identical to settings of display elements in the first sized analyzer window 315-1 (centered at location X1 and Y1) in frame #2, then the motion analyzer resource 141 produces a correlation result value equal to zero. The motion analyzer resource 141 stores the generated correlation value (such as zero) at the cell X1 and Y1 of correlation results 360-1. In such an instance, the motion vector for the rendered object as represented by grouping of display elements 420 did not move from one location to another between frame #1 and frame #2.

However, in many circumstances, because the frame #1 and frame #2 represent video data (e.g., a moving image as opposed to a still image), there is a good possibility that the rendered objects such as display elements in grouping 420 (at location X1 and Y1) correspond to a grouping of display elements that is offset with respect to location coordinate (X1, Y1) in frame #2. In other words, in contrast to the above example, assume that the motion vector is not zero for the corresponding rendered object (grouping 420).

To find the best motion vector for the grouping 420 in frame #1, the motion analyzer resource 141 repeats the process of comparing the window of display elements as captured by the first sized analyzer window 315-1 to different locations in frame #2. For example, for a second offset location, the motion analyzer resource 141 offsets a center of the first sized analyzer window 315-1 in frame #2 to a new location in frame #2 such as location centered at coordinates (X1+1, Y1). In a similar manner as previously discussed, the motion analyzer resource 141 produces a corresponding metric (correlation result) based on a sum of absolute differences (or other suitable comparison function) between settings of display elements in the offset window at coordinates (X1+1, Y1) to the corresponding settings of display elements in first-sized analyzer window 315-1 in frame #1 centered at location coordinates (X1, Y1). The motion analyzer resource 141 then stores the generated correlation results for test location (X1+1, Y1) in correlation results 360-1.

For a third sample, the motion analyzer resource 141 offsets a center of the first sized analyzer window 315-1 in frame #2 to a new location in frame #2 such as location centered at coordinates (X1+2, Y1). In a similar manner as previously discussed, the motion analyzer resource 141 produces a corresponding metric (correlation result) based on a sum of absolute differences (or other suitable function) of settings of display elements in the offset window (centered at coordinates X1+2, Y1) in frame #2 to the corresponding settings of display elements in first-sized analyzer window 315-1 in frame #1 centered at location coordinates (X1, Y1). The motion analyzer resource 141 then stores the generated correlation results at location (X1+2, Y1) in correlation results 360-1.

In this manner, the motion analyzer resource 141 checks an area surrounding coordinates X1, Y1 to identify a location (region) in frame #2 that corresponds to the grouping 420 in frame #1 at coordinates X1, Y1.

In this manner, the motion analyzer resource 141 produces a first array of correlation results 360-1 based on application of the first-sized analyzer window 315-1. The first array of correlation results 360-1 indicates different degrees of (likeness) matching of the first-sized analyzer window 315-1 of display elements surrounding the rendered object (grouping 420) at the location in the frame #1 to different possible candidate locations in the frame #2. Thus, using first-sized analyzer window 315-1, the multi-window analyzer resource 310 compares a 24×24 matrix of display element settings in frame #1 to each of the candidate 24×24 matrix of display element settings in frame #2.

In a similar manner, using SAD (Sum of Absolute Differences) or other suitable comparison function, the motion analyzer resource 141 produces a second array of correlation results 360-2 based on application of the second-sized analyzer window 315-2 to frame #1 and frame #2. For example, the second array of correlation results 360-2 indicates different degrees of matching of the second-sized analyzer window 315-2 of display elements surrounding the rendered object (grouping 420) at the location coordinate X1, Y1 in the frame #1 to each of the different candidate locations in the frame #2. However, because the second sized analyzer window 315-2 is smaller in size with respect to first sized analyzer window 315-1, the multi-window analyzer resource 310 compares a 12×12 matrix of display element settings in frame #1 to each of the candidate 12×12 matrix of display element settings in frame #2.

Thus, as a summary of the aforementioned embodiments, application of the first-sized analyzer window 315-1 includes calculating a likeness of a first-sized region of display elements (first sized analyzer window 315-1) surrounding the rendered object (grouping 420) in frame #1 to different candidate regions in frame #2. Further, application of the second-sized analyzer window 315-2 includes calculating a likeness of a second-sized region (second sized analyzer window 315-2) of display elements surrounding the rendered object (grouping 420) in frame #1 to the different candidate regions in frame #2.

As further discussed below in the following FIGS. 5 thru 10, in accordance with further embodiments, responsive to detecting that a particular candidate location in frame #2 as indicated by the first array of correlation results 360-1 provides a better match for the rendered object (grouping 420) than the candidate locations as indicated by the second array of correlation results 360-2, the motion analyzer resource 141 selects a best candidate location as indicated by correlation results 360-1 to produce the motion vector information correlating grouping 420 to a respective grouping of display elements and frame #2.

Alternatively, responsive to detecting that a particular candidate location as indicated by the second array of correlation results 360-2 provides a better match for the rendered object (grouping 420) than any candidate location as indicated by the first array of correlation results 360-1, the motion analyzer resource 141 selects a best match candidate location from the second array of correlation results 360-2 to produce the motion vector information.

Note that the motion analyzer resource 141 can generate the correlation results 360 to be any suitable sized matrix. In one embodiment, the motion analyzer resource 141 checks for movement of a rendered object from one frame to another by up to 20 or more offset elements in any direction.

As a first example of applying multi-sized analyzer windows, assume that the motion analyzer resource 141 produces the matrix of correlation results 360 (correlation results 360-1 and correlation results 360-2) as shown in FIGS. 5 and 6 based on analyzed frame #1 (corresponding to sample T1) and frame #2 (corresponding to sample time T2).

FIG. 5 is an example diagram illustrating correlation results derived from using a large analyzer window according to embodiments herein.

As previously discussed, the motion analyzer resource 141 produces correlation results 360-1 by applying the first sized analyzer window 315-1 to frame #1 and frame #2. For example, the motion analyzer resource 141 produces a value of 85 at zero offset. At coordinates (X1−2, Y1+2), the motion analyzer resource produces a metric of 58. Since the value of 58 at location coordinates (X1−2, Y1+2) in correlation results 360-1 is substantially less than all other values in the matrix of correlation results 360-1, the motion analyzer resource 141 selects location coordinates (X1−2, Y1+2) as the location in frame #2 corresponding to the grouping 420 in frame #1. In other words, the motion analyzer resource 141 detects that the region of display elements at coordinates (X1−2, Y1+2) in frame #2 is likely the best match for corresponding grouping 420 located at coordinates (X1, Y1) in frame #1. Based on these results, the motion analyzer resource 141 produces a preliminary large window motion vector for the grouping 420 in frame #1 between location coordinates (X1, Y1) in frame #1 and location coordinates (X1−2, Y1+2) in frame #2.

In following FIG. 6, and as previously discussed, note that the motion analyzer resource 141 further checks the correlation results 316-2 produced by the small analyzer window to determine if there is a better small window motion vector than as indicated by location coordinates (X1−2, Y1+2) in frame #2.

FIG. 6 is an example diagram illustrating correlation results derived from using a small analyzer window according to embodiments herein.

In this example, the motion analyzer resource 140 obtains the value stored at location coordinates (X1−2, Y1+2) in correlation results 360-2. This value is 11. The motion analyzer resource 141 compares the value 11 (corresponding to the proposed large window motion vector) to the magnitude of the other values in the matrix of correlation results 360-2. Since there are no other values less than 11 in the matrix of correlation results 360-2, the motion analyzer resource 141 produces the final motion vector for grouping 420 in frame #1 to correspond to location coordinates (X1−2, Y1+2) in frame #2. As previously discussed, this final motion vector indicates that setting of display elements in grouping 420 (such as a 4×4 grouping of display elements) at location coordinates (X1, Y1) in frame #1 correspond to settings of display elements (such as a 4×4 grouping of display elements) at coordinates (X1−2, Y1+2) in frame #2.

Figure 7:
FIG. 7 is an example diagram illustrating correlation results derived from using a large analyzer window according to embodiments herein.

As a second example of applying multi-sized analyzer windows and determining a best motion vector for a rendered object, assume that the motion analyzer resource 141 produces the matrix of correlation results 360 as shown in FIGS. 7 and 8 below based on analyzed frame #1 (corresponding to sample T1 ) and frame #2 (corresponding to sample time T2). In this example #2 however, assume that the settings of display elements in frame #1 and frame #2 are different than the settings of respective display elements as previously discussed in example #1 (FIGS. 5 and 6).

More specifically, FIG. 7 is an example diagram illustrating correlation results derived from using a large analyzer window according to embodiments herein.

As previously discussed, the motion analyzer resource 141 produces correlation results 360-1 by applying the first sized analyzer window 315-1 to frame #1 and different candidate locations in frame #2. In this example embodiment, assume that the motion analyzer resource 141 produces a value of 59 at zero offset location coordinates (X1, Y1). The setting of 58 at location coordinates (X1−2, Y1+3) is only marginally better than the value 59 at coordinates (X1, Y1). Since the value 58, which happens to be the minimal value in this example matrix of correlation results 360-1, is not substantially lower than the value 59 at coordinates (X1, Y1), the motion analyzer resource 141 sets the preliminary motion vector for the large window to be zero. In other words, the best fit match for grouping 420 is set to a corresponding grouping of display elements disposed at coordinates (X1, Y1) in frame #2. Based on these results, the motion analyzer resource 141 produces a preliminary large window motion vector between location coordinates (X1, Y1) in frame #1 to location coordinates (X1, Y1) in frame #2 as a best match.

In following FIG. 7, note that the motion analyzer resource 141 further checks the correlation results 316-2 produced by the small analyzer window to determine if there is a better small window motion vector than as indicated by location coordinates (X1, Y1) in frame #2.

FIG. 8 is an example diagram illustrating correlation results derived from using a small analyzer window according to embodiments herein.

In this example, the motion analyzer resource 140 uses the large window motion vector to obtain the value stored at location coordinates (X1, Y1) in correlation results 360-2. This value is 23. The motion analyzer resource 141 compares the value 23 (corresponding to the preliminary large window motion vector) to the magnitude of the other values in the matrix of correlation results 360-2. Since the value 11 at coordinates (X1−2, Y1+2) is smaller than the value 23 and is the smallest value in the matrix of correlation results 360-2, the motion analyzer resource 141 produces the final motion vector based upon the location coordinates (X1−2, Y1+2). In other words, the motion analyzer resource 141 produces a small window motion vector to location coordinate (X1−2, Y1+2). Because the small window motion vector at coordinates location (X1−2, Y1+2) provides a better correlation than the large window motion vector, the multi-window analyzer resource 310 produces the final motion vector for grouping 420 in frame #1 to correspond to location coordinates (X1−2, Y1+2) in frame #2.

As previously discussed, this final motion vector indicates that setting of display elements in grouping 420 (such as a 4×4 grouping of display elements) at coordinates (X1, Y1) in frame #1 correspond to settings of display elements (such as a 4×4 grouping of display elements) centered at coordinates (X1−2, Y1+2) in frame #2.

Figure 9:
FIG. 9 is an example diagram illustrating correlation results derived from using a large analyzer window according to embodiments herein.

As a third example of applying multi-sized analyzer windows and determining a best motion vector for a rendered object, assume that the motion analyzer resource 141 produces the matrix of correlation results 360 as shown in FIGS. 9 and 10 below based on analyzed frame #1 (corresponding to sample T1) and frame #2 (corresponding to sample time T2). In this example #3 however, assume that the settings of display elements in frame #1 and frame #2 are different than the settings of respective display elements as previously discussed in example #1 (FIGS. 5 and 6) and example #2 (FIGS. 7 and 8).

FIG. 9 is an example diagram illustrating correlation results derived from using a large analyzer window according to embodiments herein.

As previously discussed, the motion analyzer resource 141 produces correlation results 360-1 by applying the first sized analyzer window 315-1 to frame #1 and different candidate locations in frame #2. In this example embodiment, assume that the motion analyzer resource 141 produces a value of 59 at zero offset location coordinate (0,0). The setting of 58 at location coordinates (X1−2, Y1+2) is only slightly better than the value 59 at coordinates (X1, Y1). Since the value 58, which happens to be the minimal value in this example matrix of correlation results 360-1, is not substantially lower than the value 59 at coordinates (X1, Y1) in correlation results 360-1, the motion analyzer resource 141 sets the preliminary motion vector for the large window to be zero. In other words, the best fit match for grouping 420 is set to a corresponding grouping of display elements centered at coordinates (X1, Y1) in frame #2. Thus, based on these results, the motion analyzer resource 141 produces a preliminary large window motion vector (zero motion vector) between location coordinates (X1, Y1) in frame #1 to location coordinates (X1, Y1) in frame #2 as a best match. The setting of the large window motion vector to a zero motion vector in this example indicates that the object rendered at location coordinate (X1, Y1) in frame #1 maps to the corresponding rendered object in the same location in frame #2.

In following FIG. 10, note that the motion analyzer resource 141 further checks the correlation results 316-2 produced by the small analyzer window to determine if there is a better small window motion vector than as indicated by location coordinates (X1, Y1) in correlation results 360-1.

FIG. 10 is an example diagram illustrating correlation results derived from using a small analyzer window according to embodiments herein.

In this example, the motion analyzer resource 140 uses the large window motion vector to obtain the value stored at location coordinates (X1, Y1) in correlation results 360-2. This value is 12. The motion analyzer resource 141 compares the value 12 (corresponding to the large window motion vector) to the magnitude of the other values in the matrix of correlation results 360-2. Since the value 12 at coordinates (X1−2, Y1+2) is smallest within a margin of error, the motion analyzer resource 141 produces the final motion vector based upon the location coordinates (X1, Y1), corresponding to a (0,0) offset. In other words, the motion analyzer resource 141 produces the final motion vector for grouping 420 in frame #1 to correspond to location coordinates (X1, Y1) in frame #2. As previously discussed, this final motion vector indicates that setting of display elements in grouping 420 (such as a 4×4 grouping of display elements) at coordinates (X1, Y1) in frame #1 correspond to settings of display elements (such as a 4×4 grouping of display elements) at coordinates (X1, Y1) in frame #2.

In this manner, the motion analyzer resource 141 utilizes the generated matrices of correlation results 360 to select a best motion vector for a corresponding rendered object present in both a first frame and a second (subsequent) frame.

Figure 11:
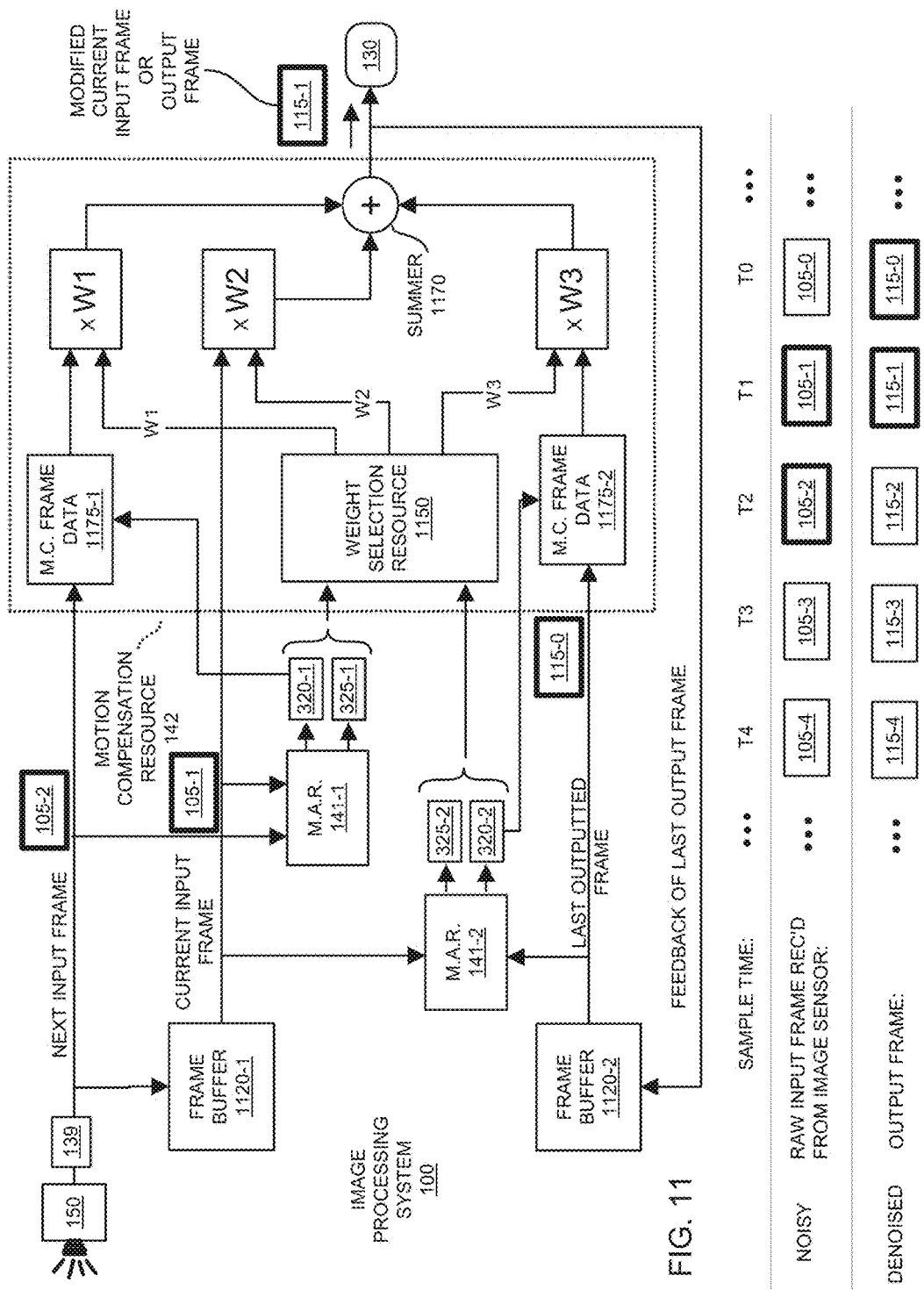
FIG. 11 is an example diagram illustrating an image processing system and corresponding frames at a first sample time according to embodiments herein.

FIG. 11 is an example diagram illustrating an image processing system and processing at sample time T1 according to embodiments herein.

In general, as shown in FIG. 11, the image processing system 100 receives a sequence of frames 105 including a current input frame 105-1 and a next input frame 105-2. The next input frame 105-2 is captured in time subsequent to capturing of the current input frame 105-1 in the sequence.

Image processing system 100 includes frame buffer 1120-1. The image processing system 100 stores image frame 105-1 in frame buffer 1120-1. The image processing system 100 also includes frame buffer 1120-2.

Image processing system 100 stores previously outputted output frame 115-0 in frame buffer 1120-2. The previously outputted output frame 115-0 is derived from previously processed input frames 105.

The image processing system 100 modifies the current input frame 105-1 based on detected first motion and second motion to produce the current output frame (modified current input frame).

The motion analyzer resource 141 detects motion in any suitable manner. In one embodiment, the motion analyzer resource 141-1 detects the first motion based on an analysis of the current input frame 105-1 (frame #1) with respect to the next input frame 105-2 (frame #2). The motion analyzer resource 141-2 detects the second motion based on an analysis of the current input frame 105-1 (frame #1) and the previously outputted output frame 115-0 (frame #2).

In a manner as previously discussed, each of the motion analyzer resources 141 implements any suitable comparison function to map renderings of objects in each of the received frames.

For example, the multiple analyzer resource 141-1 analyzes the current input frame 105-1 (processed as FRAME #1) and next input frame 105-2 (processed as FRAME #2). Via the analysis, the motion analyzer resource 141-1 produces motion vector information 320-1 mapping rendering of objects in the current input frame 105-1 to corresponding rendering of objects in the next received input frame 105-2. In one embodiment, motion analyzer resource 141 produces confidence information 325-1 to indicate a degree to which the motion vector information 320-1 is accurate. In one embodiment, the magnitude of the generated SAD values can be used as a respective confidence value. Low SAD values indicate that a respective region is likely to closely match the original object rendition. For example, the lower the SAD value for a given rendered object (one or more display elements), the more likely the respective motion vector maps display elements in a current frame (such as FRAME#1) to corresponding display elements in another frame (such as FRAME #2). Using a motion vector having a high confidence value, settings of display elements for the moving object can then be used to correct display elements of a current image.

In a similar manner, the multiple analyzer resource 141-2 analyzes the current input frame 105-1 (processed as FRAME #1) and last outputted output frame 115-0 (processed as FRAME #2). Via the analysis, the motion analyzer resource 141-2 produces motion vector information 320-2 mapping rendering of objects in the current input frame 105-1 to corresponding rendering of objects in the last outputted output frame 115-0. The previously outputted output frame 115-0 stored in frame buffer 1120-2 is a sample frame representing final settings for display elements to be played back on display screen 130 for a previous sample time (when frame 105-0 at T0 is the current input frame).

In one embodiment, the feedback of the last output frame from motion compensation resource 142 and corresponding frame buffer 1120-2 represent part of an infinite impulse response filter.

In addition to generating respective motion vector information 320-2, motion analyzer resource 141 produces confidence information 325-2 to indicate a degree to which the motion vector information 320-2 is accurate.

As previously discussed, the image processing system 100 includes motion compensation resource 142. The motion compensation resource 142 includes weight selection resource 1150.

As its name suggests, weight selection resource 1150 generates one or more weight values. In this example embodiment, the selection resource 1150 produces weight values W1, W2, and W3. In one embodiment, the sum of the weights W1, W2, and W3 equals one or 100%.

Each of the weight values represents a percentage gain applied to settings of corresponding display elements in each of the frames in order to produce the current output frame 115-1 (modified rendition of the current input frame 105-1) to be outputted from summer 1170. Motion compensation resource 142 applies the generated weight values to different sections of received images (as specified by the motion vector information) to produce corresponding output frames 115.

In this example embodiment, because the image processing system 100 produces an output frame for sample time T1, the summer 1170 outputs output frame 115-1 for display on display screen 130 or storage in a repository.

As previously discussed, in one embodiment, the motion compensation resource 142 modifies a rendition of the current input frame 105-1 to produce output frame 115-1. The modified current output frame 115-1 represents a denoised rendition of the current input frame 105-1. The image processing system 100 performs denoising based on the detected first motion of one or more rendered objects (as detected by motion analyzer resource 141-1) and second motion (as detected by motion analyzer resource 141-2) of rendered objects. The previously outputted output frame 115-0 represents a denoised rendition of a previous current input frame 105-0 in the sequence.

Note again that as an alternative to or in addition to displaying output frames 115 on display screen 130, the output frames 115 can be stored as respective image data 175 in repository 180.

In accordance with further embodiments, the weight selection resource 1150 receives the first motion vector information 320-1. As previously discussed, the motion vector information 320-1 specifies an amount of movement of a rendered object from a location in the current input frame 105-1 and a location of the rendered object in the next input frame 105-2. The weight selection resource 1150 utilizes the first motion vector information 320-1 to identify the amount of movement of the rendered object from the location in the current input frame 105-1 and the location of the rendered object in the next input frame 105-2.

Additionally, the weight selection resource 1150 receives second motion vector information 320-2. The second first motion vector information 320-2 specifies an amount of movement of the rendered object from the location in the current input frame 105-1 and a location of the rendered object in the previously outputted output frame 115-0 (stored in buffer 1120-2). The weight selection resource 1150 utilizes the second motion vector information 320-2 to identify the amount of movement of the rendered object from the location in the current input frame 105-1 and the location of the rendered object in the last outputted frame 115-0.

In one embodiment, the motion compensation resource 142 produces the motion compensation frame data 1175-1 using respective motion vector information 320-1. Motion compensation resource 142 produces the motion compensation data 1175-2 using respective motion vector information 320-2. Use of the motion vector information to produce the motion compensation data 1175 is more particularly discussed in FIGS. 16A and 16B.

Figure 16B:
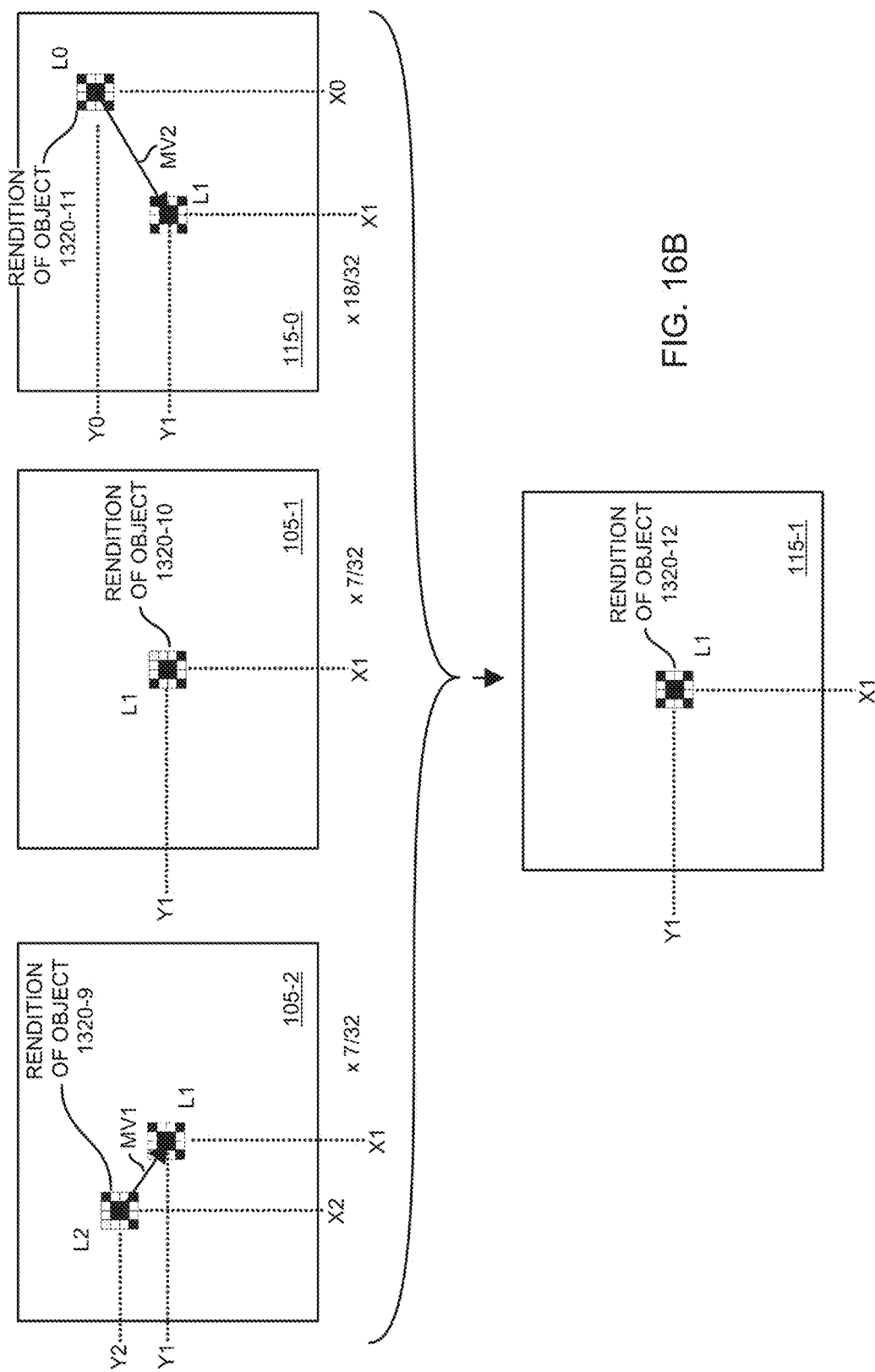

In general, the motion compensation data 1175-1 represents movement of a respective rendition of an object in the next input frame 105-2 to the same location of the rendered object in the current input frame 105-1; in a similar manner, the motion compensation data 1175-2 represents movement of a respective rendition of an object in the last outputted frame 115-0 to the same location of the rendered object in the current input frame 105-1. The weightings W1, W2, and W3 apply to the different renditions of the same rendered object, even though the rendered object may be at a different location in each the frames 105-2, 105-1, and 115-0. Again, FIGS. 16A and 16B illustrate more specific details of providing motion compensation and noise reduction. Referring again to FIG. 11, weight selection resource 1150 further receives and processes respective confidence information 325-1 and 325-2. As previously discussed, the confidence information indicates a degree to which the first motion vector information 320-1 and second motion vector information 320-2 are accurate. In one embodiment, depending on the confidence information 325-1, the weight selection resource 1150 produces weight values W1, W2, . . . indicating how to modify settings for a rendered object in the current input frame 105-1 to produce a modified current frame (115-1) for display on a display screen.

As shown in FIG. 12, if the confidence value associated with a respective motion vector (indicating motion of a rendition of an object) for the next/current frame (between frame 105-2 and frame 105-1) is below a confidence threshold value indicating that the corresponding motion vector is bad and if the confidence value associated with a respective motion vector (indicating motion of the rendition of the object) for the current/last frame (frame 105-1 and frame 115-0) is also below a confidence threshold value indicating that the corresponding motion vector is bad, the weight selection resource 1150 produces weights W1=0, W2=1, and W3=0. In such an instance, the summer 1170 produces the settings of display elements associated with the rendition of the object in the output frame 115-1 to be the same as settings of the rendition of the object in the current input frame 105-1.

As further shown in FIG. 12, if the confidence value associated with a respective motion vector (indicating motion of a rendition of an object) for the next/current frame (such as between frame 105-2 and frame 105-1) is below a confidence threshold value indicating that the corresponding motion vector is bad and if the confidence value associated with a respective motion vector (indicating motion of the rendition of the object) for the current/last frame (frame 105-1 and frame 115-0) is above a confidence threshold value indicating that the corresponding motion vector is good, the weight selection resource 1150 produces weights W1=0, W2=7/16, and W3=9/16. In such an instance, the settings of display elements associated with the rendition of the object to be included in the output frame 115-1 is a weighted combination of the rendition of the object in the current input frame 105-1 and last output frame 115-0.

As further shown in FIG. 12, if the confidence value associated with a respective motion vector (indicating motion of a rendition of an object) for the next/current frame (between frame 105-2 and frame 105-1) is above a confidence threshold value indicating that the corresponding motion vector is good and if the confidence value associated with a respective motion vector (indicating motion of the rendition of the object) for the current/last frame (frame 105-1 and frame 115-0) is below a confidence threshold value indicating that the corresponding motion vector is bad, the weight selection resource 1150 produces weights W1=1/2, W2=1/2, and W3=0. In such an instance, the settings of display elements associated with the rendition of the object to be included in the output frame 115-1 is a weighted combination of settings associated with the rendition of the object in the current input frame 105-1 and settings associated with the rendition of the object in the next input frame 105-2.

As further shown in FIG. 12, if the confidence value associated with a respective motion vector (indicating motion of a rendition of an object) for the next/current frame (between frame 105-2 and frame 105-1) is above a confidence threshold value indicating that the corresponding motion vector is good and if the confidence value associated with a respective motion vector (indicating motion of the rendition of the object) for the current/last frame (frame 105-1 and frame 115-0) is above a confidence threshold value indicating that the corresponding motion vector is good, the weight selection resource 1150 produces weights W1=7/32, W2=7/32, and W3=18/32. In such an instance, the settings of display elements associated with the rendition of the object to be included in the output frame 115-1 is a weighted combination of the rendition of the object in the current input frame 105-1, the next input frame 105-2, and the previous output frame 115-0.

Referring again to FIG. 11, subsequent to producing the weight values (W1, W2, and W3), the weight selection resource 1150 applies the first weight value W1 to the rendition of the object in the next input frame 105-2 (as captured by motion compensation frame data 1175-1) to produce a first component (first input to summer 1170) for the rendered object; the weight selection resource 1150 applies the second weight value W2 to the rendition of the object in the current input frame 105-1 to produce a second component (second input to summer 1170) for the rendered object; the weight selection resource 1150 applies the third weight value W3 to the rendition of the object in the previously outputted frame 115-0 (as captured by motion compensation frame data 1175-2) to produce a third component (third input to summer 1170) for the rendered object.

The weight selection resource 1150 implements summer 1170 to sum the first component, second component, and third component to produce the rendition of the object for inclusion in the output frame 115-1 (modified current input frame).

Accordingly, via processing as discussed herein, the motion compensation resource 142 is able to identify respective renditions of the same object in multiple image frames (next input frame 105-2, current input frame 105-1, and last outputted frame 115-0) to produce a rendition of the object for inclusion in the modified current input frame 115-1 (output frame). The motion compensation resource 142 uses a combination of the settings of display elements associated with the rendered object from multiple frames (next, current, and previous time samples) to reduce an amount of noise associated with a respective rendition of the object in the output frame 115-1.

In one embodiment, the motion compensation resource 142 utilizes a location of the object in the current input frame 105-1 as a location to render a denoised rendition of the object in the output frame 115-1. For example, the location of the rendered object in the current input frame 105-1 dictates a corresponding location that the denoised rendered object is to be displayed in the output frame 115-1. In other words, the motion compensation resource 142 may use the motion vector information to identify display element settings associated with the rendered object at different locations in the different frames. However, the motion compensation resource displays the denoised rendition of the object at the location of the rendered object as specified in the current input frame 105-1.

Accordingly, the current input frame 105-1 can include a rendition of a moving object also rendered in both the next input frame 105-2 and the previously outputted output frame 115-0. The motion compensation resource 142 produces the rendition of the object for the current output frame 115-1 based on a rendition of the moving object in the next input frame 105-2 and/or a rendition of the object in the previously outputted output frame 115-0.

Figure 13:
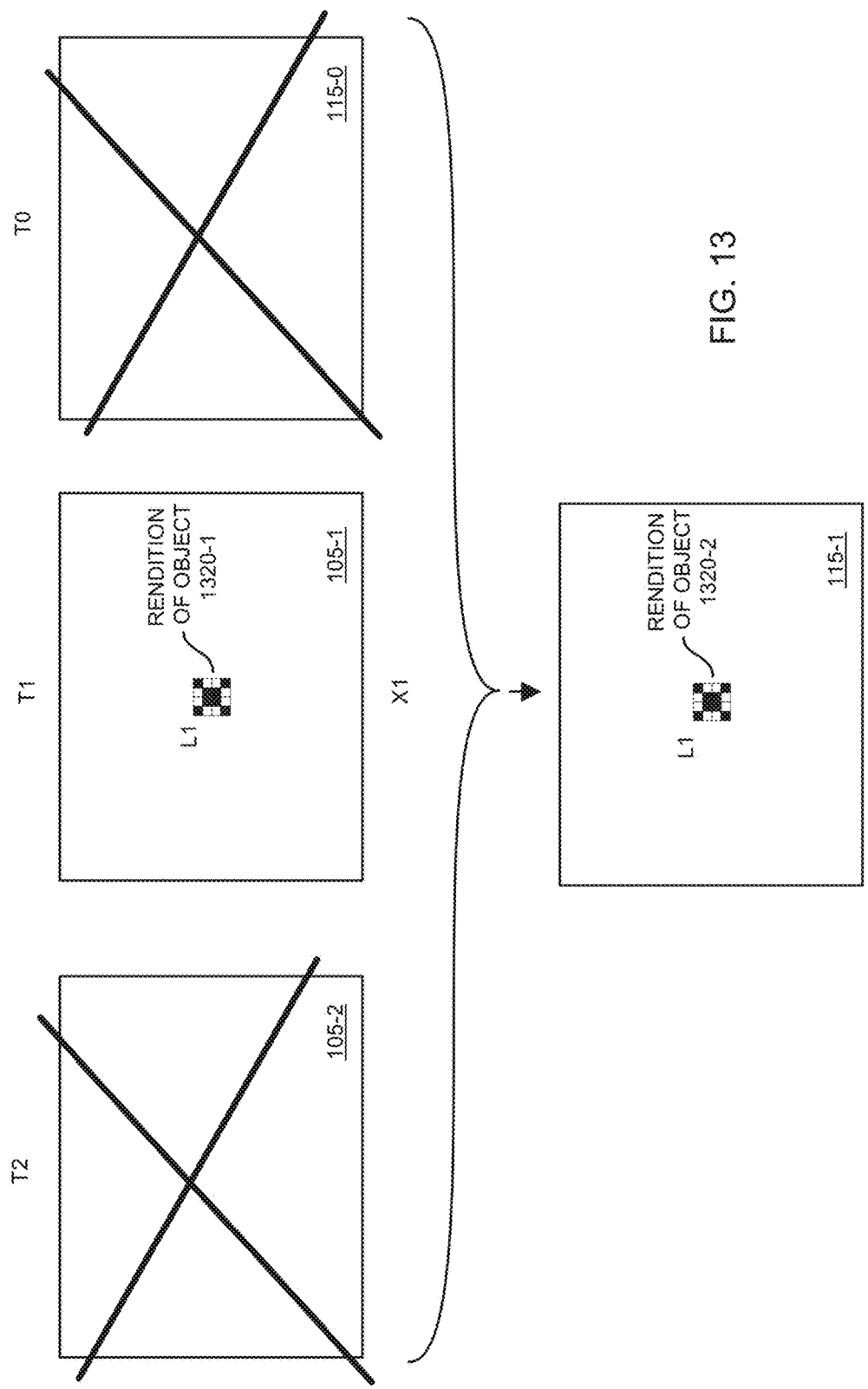
FIG. 13 is an example diagram illustrating generation of a first set of weight values according to embodiments herein.

FIG. 13 is an example diagram illustrating generation of a respective image frame according to embodiments herein.

As shown in this example embodiment, assume that the motion analyzer resource 141-1 performs a comparison of the current input frame 105-1 to the next input frame 105-2. The motion analyzer resource 141-1 detects presence of rendition of object 1320-1 in the current input frame 105-1. However, the motion analyzer resource 141-1 is unable to find a good match of the respective object (1320) in the next input frame 105-2. The motion analyzer resource 141-1 produces motion vector information 320-1 and confidence information 325-1 to indicate that there is no good rendition of object (1320) detected in next input frame 105-2. This can include generating a zero motion vector and/or corresponding low confidence value for rendition of object 1320-1.

Further in this example embodiment, the motion analyzer resource 141-2 performs a comparison of the current input frame 105-1 to the last outputted frame 115-0. As previously mentioned, the motion analyzer resource 141-2 detects presence of rendition of object 1320-1 in the current input frame 105-1. However, the motion analyzer resource 141-2 is unable to find a good match of the respective object (1320) in the last outputted frame 115-0. The motion analyzer resource 141-2 produces motion vector information 320-2 and confidence information 325-2 to indicate that there is no good rendition of object (1320) detected in last outputted frame 115-0. This can include generating a zero motion vector and/or corresponding low confidence value for rendition of object 1320-1.

As previously discussed, weight selection resource 1150 processes the generated motion vector information 320 and corresponding confidence information 325. Because confidence information 325-1 indicates there is low confidence (such as below a threshold value) that there is a good match of the rendition of the object 1320-1 to any renditions of objects in input frame 105-2 and because confidence information 325-2 indicates there is low confidence (such as below a threshold value) that there is a good match of the rendition of the object 1320-1 to any objects in the last outputted frame 115-0, the weight selection resource produces the weight values W1=0, W2=1, and W3=0.

Based on such weight settings, the motion compensation resource 142 produces the current output frame 115-1 to include a rendition of the object 1320-2. In this example, because the weight value W2=1, the motion compensation resource 142 produces the rendition of the object 1320-2 to be the same as rendition of the object 1320-1. As previously discussed, the motion compensation resource 142 produces the rendition of object 1320-2 to be at the same location in frame 115-1 as the location of rendition of object 1320-1 in input frame 105-1. In other words, if the rendition of object 1320-1 is located at coordinates X1, Y1, the motion compensation resource 142 produces the rendition of object 1320-2 in frame 115-1 to be at location X1, Y1.

Figure 14:
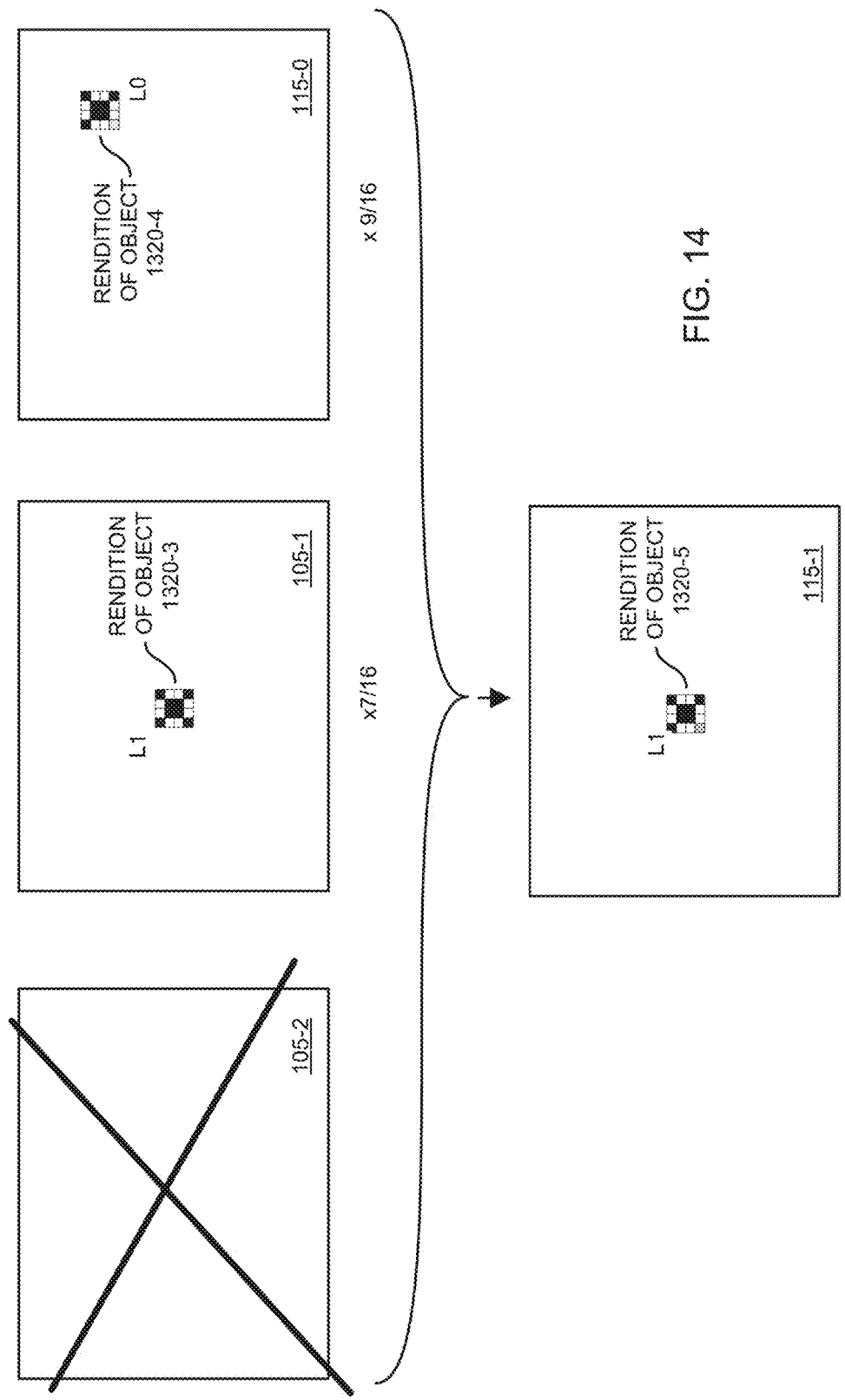
FIG. 14 is an example diagram illustrating generation of a second set of weight values according to embodiments herein.

FIG. 14 is an example diagram illustrating generation of a respective image frame from multiple frames according to embodiments herein.

As shown in this example embodiment, assume that the motion analyzer resource 141-1 performs a comparison of the current input frame 105-1 to the next input frame 105-2. The motion analyzer resource 141-1 detects presence of rendition of object 1320-3 in the current input frame 105-1. However, the motion analyzer resource 141-1 is unable to find a good match of the respective object (1320) in the next input frame 105-2. The motion analyzer resource 141-1 produces motion vector information 320-1 and confidence information 325-1 to indicate that there is no good rendition of object (1320) detected in next input frame 105-2. This can include generating a zero motion vector and/or corresponding low confidence value for rendition of object 1320-1.

Further in this example embodiment, the motion analyzer resource 141-2 performs a comparison of the current input frame 105-1 to the last outputted frame 115-0. The motion analyzer resource 141-2 detects presence of rendition of object 1320-3 in the current input frame 105-1. The motion analyzer resource 141-2 is able to find a good match of the respective object (1320) in the last outputted frame 115-0. In such an instance, the motion analyzer resource 141-2 produces motion vector information 320-2 and confidence information 325-2 to indicate that rendition of object 1320-4 detected in the last outputted frame 115-0 is a good match to the rendition of object 1320-3 in input frame 105-1. This can include generating a non-zero motion vector and/or corresponding high confidence value.

As previously discussed, weight selection resource 1150 processes the generated motion vector information 320 and corresponding confidence information 325. Because confidence information 325-1 indicates there is low confidence (such as below a threshold value) that there is a good match of the rendition of the object 1320-1 to any renditions of objects in input frame 105-2 and because confidence information 325-2 indicates there is high confidence (such as above a threshold value) that there is a good match of the rendition of the object 1320-3 to rendition of object 1320-4 in the last outputted frame 115-0, the weight selection resource produces the weight values W1=0, W2=7/16, and W3=9/16.

Based on such weight settings, the motion compensation resource 142 produces the current output frame 115-1 to include a rendition of the object 1320-5. In this example, because the weight value W2=7/16 and W3=9/16, the motion compensation resource 142 and respective summer 1170 produces the rendition of the object 1320-5 to be a weighted average of settings associated with the renditions of objects 1320-3 and 1320-4. As previously discussed, the motion compensation resource 142 produces the rendition of object 1320-5 to be at the same location in frame 115-1 as the location of rendition of object 1320-3 in input frame 105-1. In other words, if the rendition of object 1320-3 is located at coordinates X1, Y1, the motion compensation resource 142 produces the rendition of object 1320-5 in frame 115-1 to be at location X1, Y1 as well.

Assume that a pixel in the rendition of object 1320-3 is set to 16 and that a corresponding pixel in rendition of object 1320-4 (at a same location) is set to a value of 32. Using the weightings generated by weight selection resource 1150, the summer 1170 produces a corresponding setting for the pixel equal to 25. Via an iterative process, summer 1170 produces a respective setting for each display element in the rendition of object 1320-5 in a similar manner.

Accordingly, embodiments herein include utilizing the current input frame 105-1 identify a location of an object captured in the current input frame 105-1; and deriving settings for the object (1320) in output frame 115-1 based at least in part on settings of a rendering of the object 1320-4 in the previously outputted frame 115-0, the rendering of the object 1320-4 in the previously outputted frame 115-0 located at a different location than a location of the rendered object 1320-3 in the current input frame 105-1.

FIG. 15 is an example diagram illustrating generation of a respective image frame from multiple frames according to embodiments herein.

As shown in this example embodiment, assume that the motion analyzer resource 141-1 performs a comparison of the current input frame 105-1 to the next input frame 105-2. The motion analyzer resource 141-1 detects presence of rendition of object 1320-7 in the current input frame 105-1. The motion analyzer resource 141-2 is able to find a good match of the respective rendition of object 1320-7 to rendition of object 1320-6 in the frame 105-2. The motion analyzer resource 141-1 produces motion vector information 320-1 and confidence information 325-1 to indicate that rendition of object 1320-6 detected in the frame 105-2 is a good match to the rendition of object 1320-7 in input frame 105-1. This can include generating a non-zero motion vector and/or corresponding high confidence value.

Motion analyzer resource 141-2 compares the current input frame to the last put frame 115-0. The motion analyzer resource 141-2 detects presence of the rendition of object 1320-7 in the current input frame 105-1. However, the motion analyzer resource 141-2 is unable to find a good match of the respective object 1320-7 to any objects in the frame 115-0. The motion analyzer resource 141-2 produces motion vector information 320-2 and confidence information 325-2 to indicate that there is no good rendition of object (1320) detected in frame 115-0. This can include generating a zero motion vector and/or corresponding low confidence value for rendition of object 1320-7.

As previously discussed, weight selection resource 1150 processes the generated motion vector information 320 and corresponding confidence information 325. Because confidence information 325-1 indicates there is high confidence (such as above a threshold value) that there is a good match of the rendition of the object 1320-7 to rendition of object 1320-6 in input frame 105-2 and because confidence information 325-2 indicates there is low confidence (such as below a threshold value) that there is any good match of the rendition of the object 1320-7 to any rendition of object in the last outputted frame 115-0, the weight selection resource produces the weight values W1=1/2, W2=1/2, and W3=0.

Based on such weight settings, the motion compensation resource 142 produces the current output frame 115-1 to include a rendition of the object 1320-8. In this example, because the weight value W1=1/2 and W2=1/2, the motion compensation resource 142 and respective summer 1170 produces the rendition of the object 1320-8 to be a weighted average of display element settings for the renditions of objects 1320-6 and 1320-7. As previously discussed, the motion compensation resource 142 produces the rendition of object 1320-8 to be at the same location in frame 115-1 as the location of rendition of object 1320-7 in input frame 105-1. In other words, if the rendition of object 1320-7 is located at coordinates X1, Y1, the motion compensation resource 142 produces the rendition of object 1320-8 in frame 115-1 to be at location X1, Y1 as well.

Assume that a pixel in the rendition of object 1320-6 is set to 48 and that a corresponding pixel in rendition of object 1320-7 is set to a value of 56. Using the weightings generated by weight selection resource 1150, the summer 1170 produces a corresponding setting for the pixel equal to 52. Summer 1170 produces a respective setting for each of one or more display elements in the rendition of object 1320-8 in a similar manner.

Accordingly, embodiments herein include: utilizing the current input frame 105-1 to identify a location of an object 1320-7 captured in the current input frame 105-1; and deriving settings for a rendition of the object 1320-8 in the modified current input frame (output frame 115-1) based at least in part on settings of a rendering of the object 1320-6 in the next input frame 105-2, the rendering of the object 1320-6 in the next input frame 105-2 being located at a different location than a location of the rendered object 1320-7 in the current input frame 105-1.

FIG. 16A is an example diagram illustrating generation of a respective image frame from multiple frames according to embodiments herein.

As shown in this example embodiment, assume that the motion analyzer resource 141-1 performs a comparison of the current input frame 105-1 to the next input frame 105-2. Based on processing, the motion analyzer resource 141-1 detects presence of rendition of object 1320-10 (at location coordinates X1, Y1) in the current input frame 105-1. Assume that the motion analyzer resource 141-1 is able to find a good match of the respective rendition of object 1320-10 to rendition of object 1320-9 at location coordinates X2, Y2 (L2) in the frame 105-2. The motion analyzer resource 141-1 produces motion vector information 320-1 and/or confidence information 325-1 to indicate that rendition of object 1320-9 detected in the frame 105-2 is a good match to the rendition of object 1320-10 in input frame 105-1. In other words, the motion analyzer resource 141-1 generates motion vector MV1 indicating that the rendition of object 1320-10 is a rendition of the same object rendered at location L2 in frame 105-2. This can include generating a non-zero motion vector (MV1) and/or corresponding high confidence value. Assume that the confidence value for motion vector MV1 is high due to a low SAD value.

Additionally, the motion analyzer resource 141-2 performs a comparison of the current input frame 105-1 to the last outputted frame 115-0. Assume that the motion analyzer resource 141-2 detects presence of the rendition of object 1320-10 in the current input frame 105-1 and is able to find a good match of the respective rendered object 1320-10 to rendition of object 1320-11 in the last outputted frame 115-0. The motion analyzer resource 141-2 detects that rendition of object 1320-11 is located at coordinates X0, Y0 (location L0). The motion analyzer resource 141-2 produces motion vector information 320-2 and/or confidence information 325-2 (such as motion vector MV2) to indicate that rendition of object 1320-11 detected in the last outputted frame 115-0 is a good match to the rendition of object 1320-10 in input frame 105-1. This can include generating a non-zero motion vector MV2 and/or corresponding high confidence value (e.g., a low SAD value).

As previously discussed, weight selection resource 1150 processes the generated motion vector information 320 and corresponding confidence information 325. Because confidence information 325-1 indicates there is high confidence (such as above a threshold value) that there is a good match of the rendition of the object 1320-10 to rendition of object 1320-9 in input frame 105-2 and because confidence information 325-1 indicates there is high confidence (such as above a threshold value) that there is any good match of the rendition of the object 1320-10 to rendition of object 1320-11 in the last outputted frame 115-0, the weight selection resource 1150 produces the weight values W1=7/32, W2=7/32, and W3=18/32.

Based on such weight settings, the motion compensation resource 142 produces the current output frame 115-1 to include a rendition of the object 1320-12. In this example, because the weight value W0=7/32, W1=7/32, and W3=18/32, the motion compensation resource 142 and respective summer 1170 produces the rendition of the object 1320-12 to be a weighted average of the renditions of objects 1320-9, 1320-10, and 1320-11. As previously discussed, the motion compensation resource 142 produces the rendition of object 1320-12 to be at the same location in frame 115-1 as the location of rendition of object 1320-10 in input frame 105-1. In other words, if the rendition of object 1320-10 is located at coordinates X1, Y1, the motion compensation resource 142 produces the rendition of object 1320-12 in frame 115-1 to be at location X1, Y1 as well.

Accordingly, embodiments herein include: detecting an object (1320) rendered in each of: the current input frame 105-1, the next successive input frame 105-2, and the stored previously outputted output frame 115-0, wherein the rendered object 1320 is captured at different locations in each of the frames as specified by respective motion vector information 320; and modifying settings of the rendered object 1320-10 in the current input frame 105-1 to produce the modified current input frame 115-1 depending on: i) settings of display elements of the rendered object 1320-9 in the next successive input frame 105-2, and ii) settings of display elements of the rendered object 1320-1 in the previously outputted output frame 115-0.

FIG. 16B is a more particular example diagram of FIG. 16A illustrating generation of weight values according to embodiments herein. FIGS. 16A and 16B illustrate the same processing and generation of a respective output frame, one being more specific than the other.

In this example embodiment, the motion compensation resource 142 utilizes the motion vector MV1 (associated with the rendered object) to produce the motion compensation frame data 1175-1 in which the rendition of object 1320-9 is moved from original location L2 (coordinates X2, Y2) to location L1 (coordinates X1, Y1) corresponding to a location of rendition of object 1320-10. In other words, the motion compensation frame data 1175-1 includes a motion compensated movement of the rendition of object 1320-9 from original location L2 (coordinates X2, Y2) to location L1 (coordinates X1, Y1).

Additionally, the motion compensation resource 142 utilizes the motion vector MV2 to produce the motion compensation frame data 1175-2 in which the rendition of object 1320-11 is moved from original location L0 (coordinates X0, Y0) to location L1 (coordinates X1, Y1). In other words, the motion compensation frame data 1175-2 includes a motion compensated movement of the rendition of object 1320-11 from original location L0 (coordinates X0, Y0) to location L1 (coordinates X1, Y1).

In a manner as previously discussed, the motion compensation resource 142 applies different weights (W1=7/32, W2=7/32, and W3=18/32) to the object renditions (1320-9, 1320-10 and 1320-11) at location L1 as shown to produce display elements for the rendition of object 1320-12 (at location L1) in frame 115-1. For example, to produce the current output frame 115-1: the weight selection resource 1170 applies the weight W1 to the rendition of object 1320-9 at location L1; the weight selection resource 1170 applies the weight W2 to the rendition of object 1320-10 at location L1; the weight selection resource 1170 applies the weight W3 to the rendition of object 1320-11 at location L0; Thus, the settings of display elements associated with the same rendered object but at different locations are used to produce the rendition of object 1320-12 at location L1 in frame 115-1.

Accordingly, the settings of a particular rendered moving object detected from one frame to another are used to modify current settings of the particular object rendered in an output frame.

Figure 17:
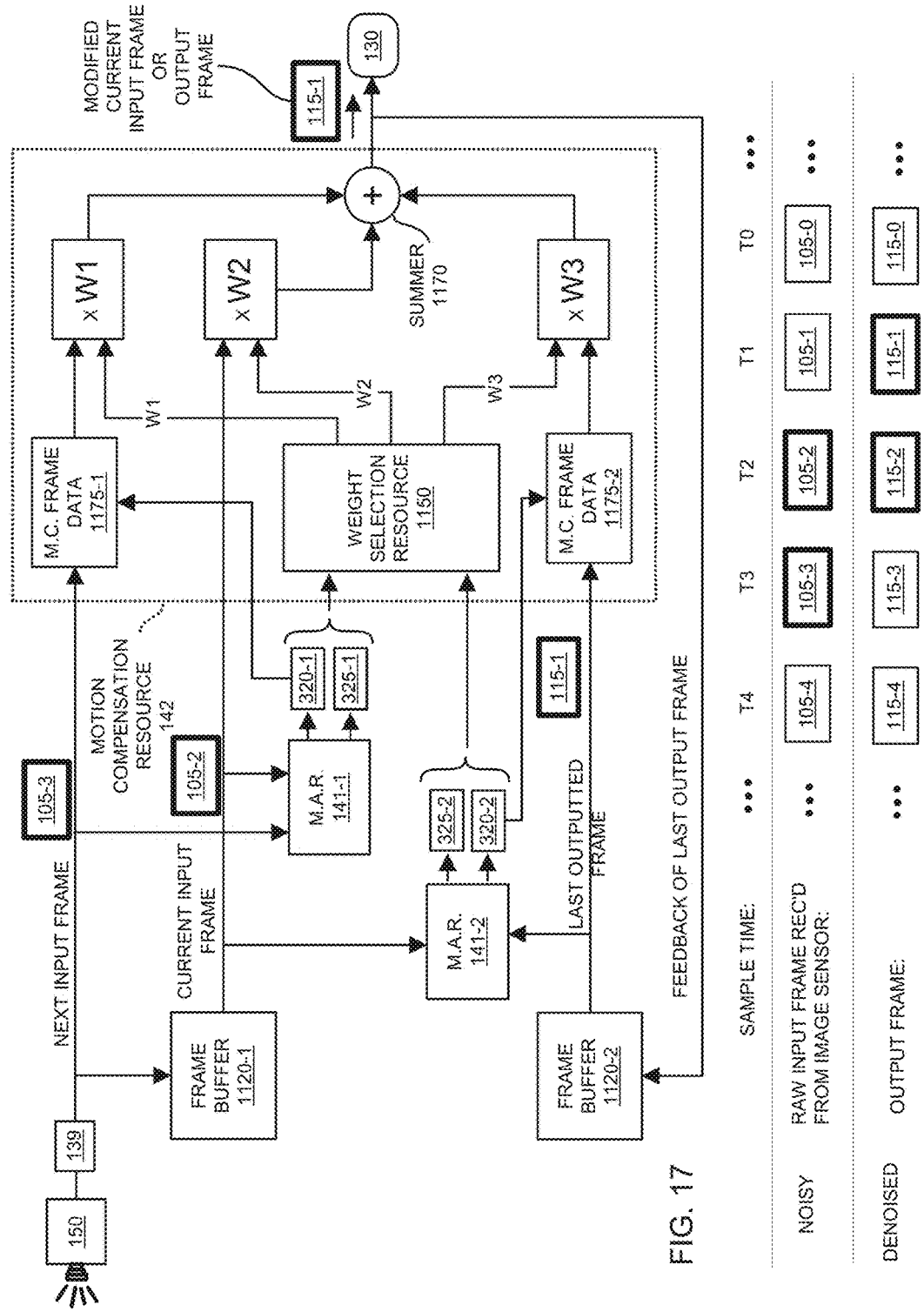
FIG. 17 is an example diagram illustrating an image processing system and corresponding frames at a second sample time according to embodiments herein.

FIG. 17 is an example diagram illustrating processing of frames at a next sample time according to embodiments herein.

In this example, at sample time T2 (next sample time than as previously discussed with respect to FIG. 11), image sensor 150 produces next input frame 105-3. Frame buffer 1120-1 stores current input frame 105-2. Frame buffer 1120-2 stores last outputted frame 115-1.

In one embodiment, the computer system 125 includes a pre-processing module 139. The pre-processing module 139 can be configured to receive raw image frames from image sensor 150 and produce sequence of frames 105. In one non-limiting example embodiment, the sequence of frames 105 is a YUV image stream. In such an instance, the sequence of frames 105 is not directly produced by the image sensor 150. Instead, the pre-processing module 139 receives raw image frames from image sensor 150 and converts the raw image frames to a YUV or other suitable type of image stream.

Note that presence of image sensor 150 is shown by way of non-limiting example only. As an alternative to receiving image data originating from image sensor 150, the display management resource 140 can be configured to receive the sequence of frames 105 or raw image data from any suitable source. Accordingly, the noise reduction techniques as described herein can be applied to received frames of images originating from any suitable resource. In a similar manner as previously discussed, the motion analyzer resource 141-1 compares the current input frame 105-2 to the next input frame 105-3. Based on the comparison, the motion analyzer resource 141-1 produces motion vector information 320-1 and confidence information 325-1 for detected renditions of moving objects from one frame to the next.

The motion analyzer resource 141-1 compares the current input frame 105-2 to the last outputted frame 115-1 store in frame buffer 1120-2. Based on the comparison, the motion analyzer resource 141-2 produces motion vector information 320-2 and confidence information 325-2 for detected renditions of moving objects from one frame to the next.

In a similar manner as previously discussed, weight selection resource 1150 utilizes the generated data (motion vector information 320 and confidence information 325) to modify the current input frame 105-2 and produce corresponding output frame 115-2.

Figure 18:
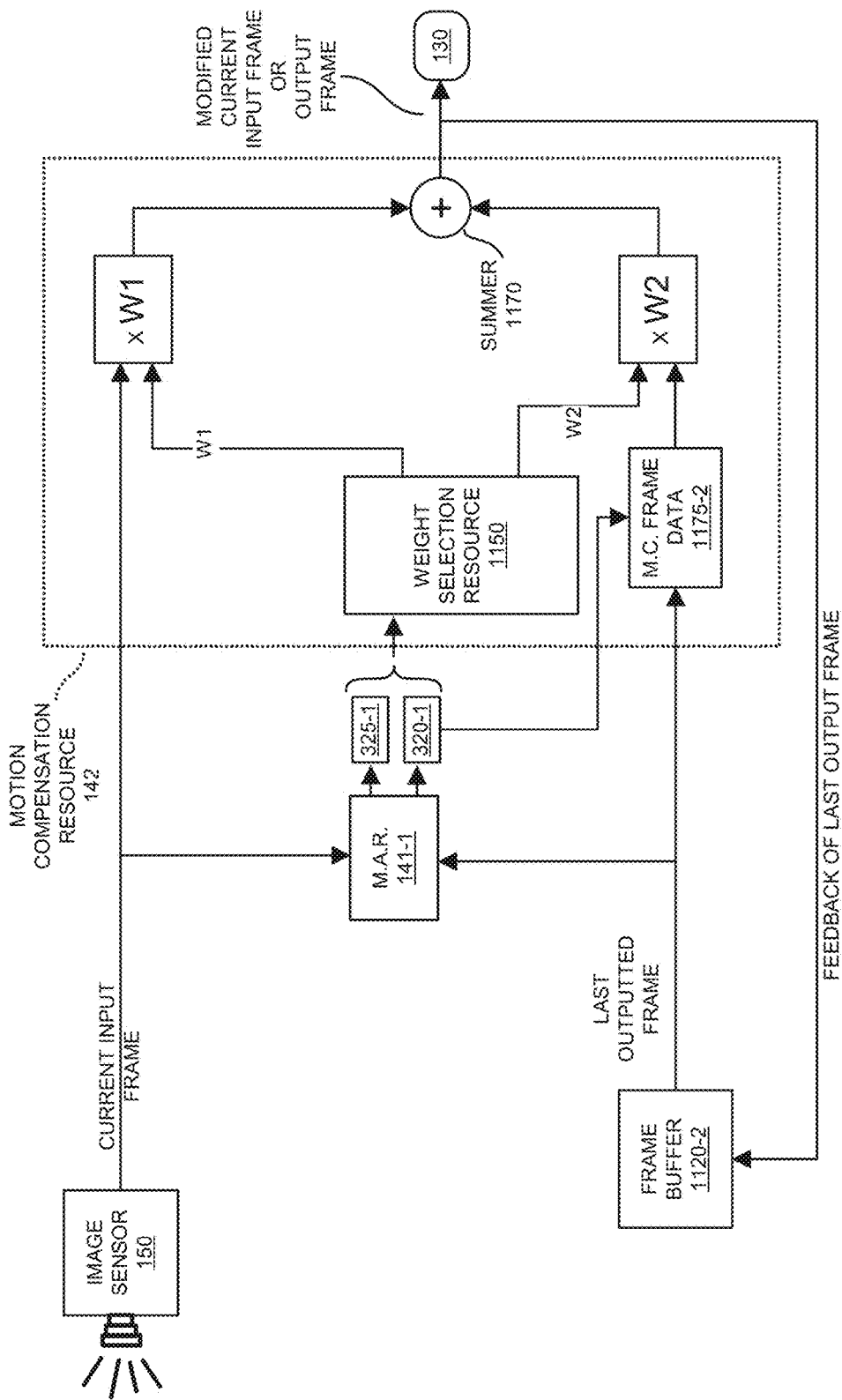
FIG. 18 is an example diagram illustrating an image processing system that produces output frames based on multiple frames according to embodiments herein.

FIG. 18 is another example diagram illustrating an image processing system according to embodiments herein.

This example embodiment excludes frame buffer 1120-1. As shown, via motion analyzer resource 141-1, the corresponding image processing system in FIG. 18 compares the current input frame to the last outputted frame (stored in frame buffer 1120-2) to detect motion associated with a rendered object present in both the current input frame in the last outputted frame.

In a similar manner as previously discussed, motion analyzer resource 141-1 produces motion vector information 320-1 and confidence information 325-1. If a rendition of an object in the current input frame is detected as being present in the last outputted frame stored in frame buffer 1120-2, the motion compensation resource produces a respective output frame based on a rendition of the object in the current input frame and the last outputted frame using weight values W1 and W2. The motion compensation resource 142 generates the rendition of the object in the output frame based on the same location of the rendition of the object in the current input frame.

Figure 19:
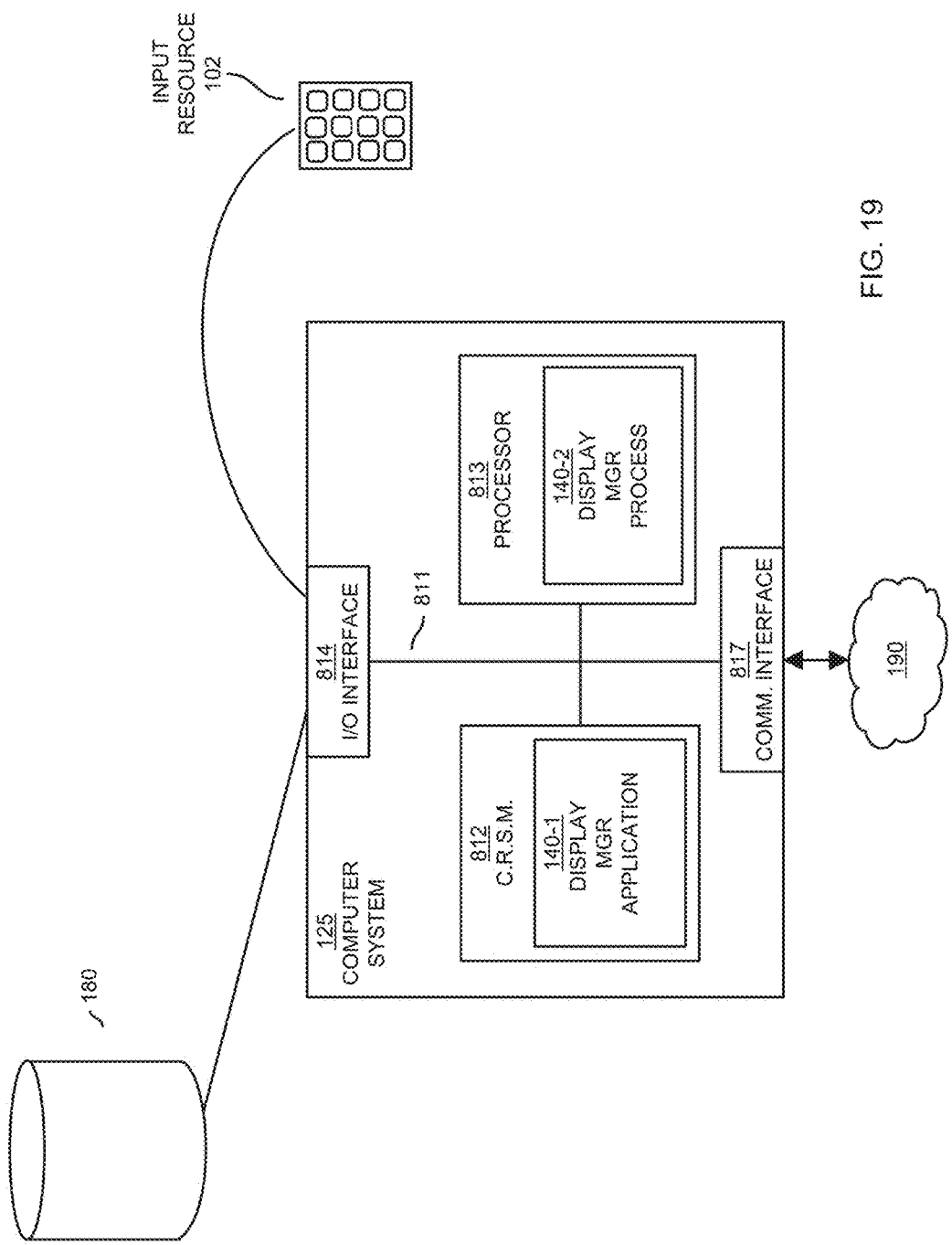
FIG. 19 is a diagram illustrating an example computer architecture in which to execute any of the functionality according to embodiments herein.

FIG. 19 is an example block diagram of a computer device for implementing any of the operations as discussed herein.

As shown, computer system 125 of the present example includes an interconnect 811, a processor 813 (such as one or more processor devices, computer processor hardware, etc.), computer readable storage medium 812 (such as hardware storage to store data), I/O interface 814, and communications interface 817.

Interconnect 811 provides connectivity amongst processor 813, computer readable storage media 812, I/O interface 814, and communication interface 817.

I/O interface 814 provides connectivity to a repository 880 and, if present, other devices such as a playback device, display screen, input resource 102, a computer mouse, etc.

Computer readable storage medium 812 (such as a non-transitory hardware medium) can be any hardware storage resource or device such as memory, optical storage, hard drive, rotating disk, etc. In one embodiment, the computer readable storage medium 812 stores instructions executed by processor 813.

Communications interface 817 enables the computer system 850 and processor 813 to communicate over a resource such as network 190 to retrieve information from remote sources and communicate with other computers. I/O interface 814 enables processor 813 to retrieve stored information such as from repository 180.

As shown, computer readable storage media 812 is encoded with display manager application 140-1 (e.g., software, firmware, etc.) executed by processor 813. Display manager application 140-1 can be configured to include instructions to implement any of the operations as discussed herein.

During operation of one embodiment, processor 813 (e.g., computer processor hardware) accesses computer readable storage media 812 via the use of interconnect 811 in order to launch, run, execute, interpret or otherwise perform the instructions in display manager application 140-1 stored on computer readable storage medium 812.

Execution of the display manager application 140-1 produces processing functionality such as display manager in processor 813. In other words, the display manager process 140-2 associated with processor 813 represents one or more aspects of executing display manager application 140-1 within or upon the processor 813 in the computer system 125.

Those skilled in the art will understand that the computer system 850 can include other processes and/or software and hardware components, such as an operating system that controls allocation and use of hardware resources to execute display manager application 140-1.

In accordance with different embodiments, note that computer system may be any of various types of devices, including, but not limited to, a wireless access point, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device. The computer system 850 may reside at any location or can be included in any suitable resource in network environment 100 to implement functionality as discussed herein.

Functionality supported by the different resources will now be discussed via flowcharts in FIGS. 20 and 21. Note that the steps in the flowcharts below can be executed in any suitable order.

Figure 20:
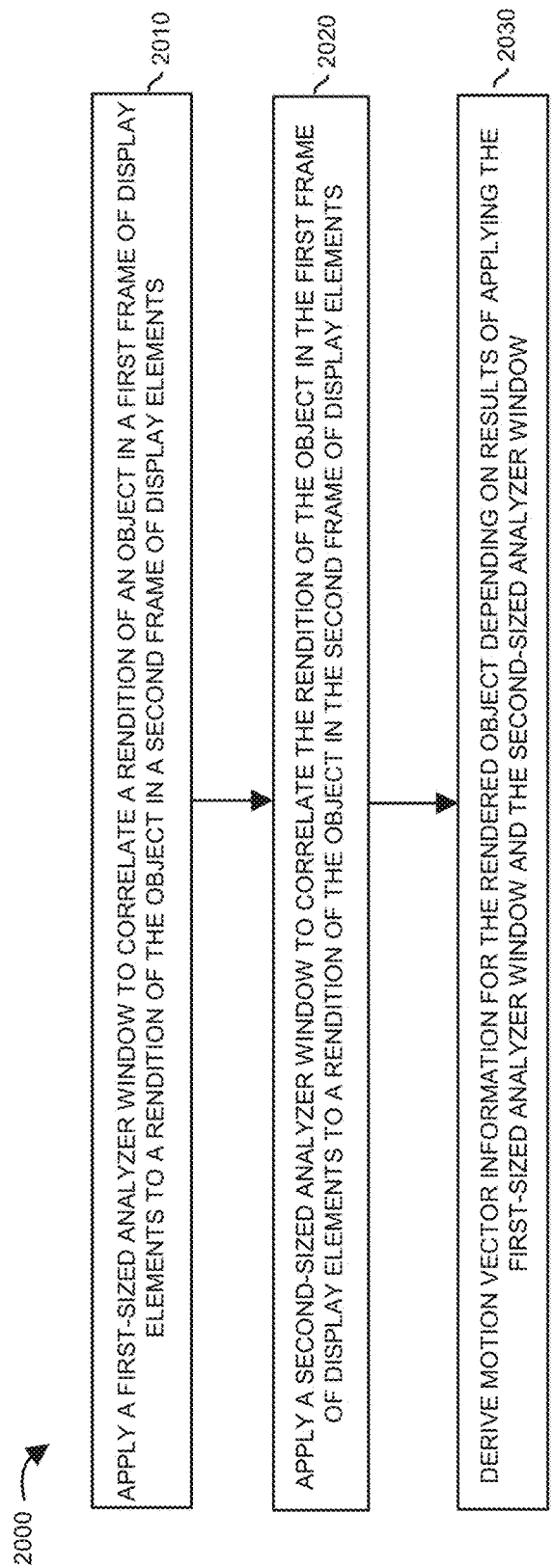
FIGS. 20 and 21 are example diagrams illustrating methods according to embodiments herein.

FIG. 20 is a flowchart 2000 illustrating an example method according to embodiments herein. Note that there will be some overlap with respect to concepts as discussed above.

In processing block 2010, the display manager application 140 applies a first-sized analyzer window 315-1 to correlate a rendition of an object in a first frame of display elements to a rendition of the object in a second frame of display elements.

In processing block 2020, the display manager application 140 applies a second-sized analyzer window 315-2 to correlate the rendition of the object in the first frame of display elements to a rendition of the object in the second frame of display elements.

In processing block 2030, the display manager application 140 derives motion vector information 320 for the rendered object depending on results of applying the first-sized analyzer window 315-1 and the second-sized analyzer window 315-2.

Figure 21:
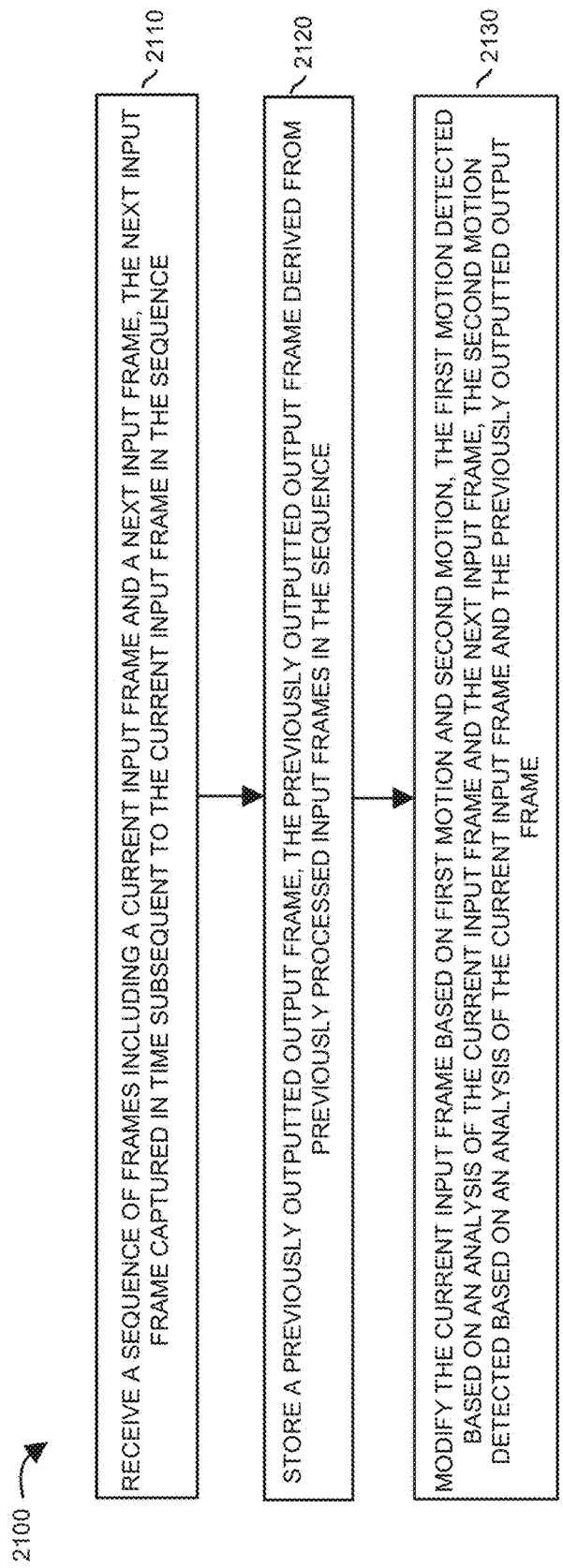

FIG. 21 is a flowchart 2100 illustrating an example method according to embodiments herein. Note that there will be some overlap with respect to concepts as discussed above.

In processing block 2110, the display manager application 140 receives a sequence of frames 105 including a current input frame and a next input frame, the next input frame captured in time subsequent to the current input frame in the sequence.

In processing block 2120, the display manager application 140 stores a previously outputted output frame in frame buffer 1120-2. The previously outputted output frame is derived from previously processed input frames in the sequence 105.

In processing block 2130, the display manager application 140 modifies the current input frame based on first motion and second motion. The first motion is detected based on an analysis of the current input frame and the next input frame. The second motion is detected based on an analysis of the current input frame and the previously outputted output frame in the frame buffer 1120-2.

Note again that techniques herein are well suited for use in providing more realistic representations of moving images. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. An image processing method to denoise image frames, the method comprising:

receiving a sequence of image frames including a current input image frame and a next input image frame, the next input image frame received in the sequence after the current input image frame;

to denoise and convert the current input image frame into a modified current input image frame: i) implementing a first multi-window motion analyzer resource to detect first motion based on a first analysis in which the first multi-window motion analyzer resource analyzes the current input image frame with respect to the next input image frame, the first multi-window motion analyzer resource applying multiple different sized analyzer windows to detect the first motion, and ii) implementing a second multi-window motion analyzer resource to detect second motion based on a second analysis in which the second multi-window motion analyzer resource analyzes the current input image frame and a previously outputted image frame, the second multi-window motion analyzer resource applying multiple different sized analyzer windows to detect the second motion;

outputting the modified current input image frame; and storing the modified current input image frame in a frame buffer.

2. The image processing method of claim 1, wherein the first multi-window motion analyzer resource applies a first-sized analyzer window to detect the first motion.

3. The image processing method of claim 2, wherein the first multi-window motion analyzer resource further applies a second-sized analyzer window to detect the first motion.

4. The image processing method of claim 3, wherein the first multi-window motion analyzer resource derives motion vector information based on the detected first motion.

5. The image processing method as in claim 4, wherein the first multi-window motion analyzer resource uses the first-sized analyzer window and the second-sized analyzer window to detect the first motion based on detecting movement of a rendition of an object from a first location in the current input image frame to second location in the next input image frame.

6. The image processing method of claim 5, wherein the second multi-window motion analyzer resource applies the first-sized analyzer window to detect the second motion; and
wherein the second multi-window motion analyzer resource further applies the second-sized analyzer window to detect the second motion.

7. The image processing method of claim 6, wherein the second multi-window motion analyzer resource derives second motion vector information based on the detected second motion.

8. The image processing method of claim 1, wherein a first-sized analyzer window of the first multi-window motion analyzer resource is sized to analyze a first number of display elements in the current input image frame and wherein a second-sized analyzer window of the first multi-window motion analyzer resource is sized to analyze a second number of display elements in the current input image frame.

9. The image processing method of claim 8, wherein the different sized analyzer windows of the first multi-window motion analyzer resource includes a first sized analyzer window and a second sized analyzer window; and
wherein a total number of display elements in the second sized analyzer window is less than a total number of display elements in the first sized analyzer window.

10. The image processing method of claim 9, wherein the first sized analyzer window is sized to be a matrix of 24×24 display elements and the second size analyzer window is sized to be a matrix of 12×12 display elements.

11. A non-transitory computer readable medium comprising instructions to be executed by computer processor hardware, wherein the instructions, when executed by the computer processor hardware, perform operations comprising:
receiving a sequence of image frames including a current input image frame and a next input image frame, the next input image frame received in the sequence after the current input image frame;
to denoise and convert the current input image frame into a modified current input image frame: i) implementing a first multi-window motion analyzer resource to detect first motion based on a first analysis in which the first multi-window motion analyzer resource analyzes the current input image frame with respect to the next input image frame, the first multi-window motion analyzer resource applying multiple different sized analyzer windows to detect the first motion, and ii) implementing a second multi-window motion analyzer resource to detect second motion based on a second analysis in which the second multi-window motion analyzer resource analyzes the current input image frame and a previously outputted image frame, the second multi-window motion analyzer resource applying multiple different sized analyzer windows to detect the second motion;
outputting the modified current input image frame; and
storing the modified current input image frame in a frame buffer.

12. The non-transitory computer readable medium of claim 11, wherein the first multi-window motion analyzer resource applies a first-sized analyzer window to detect the first motion.

13. The non-transitory computer readable medium of claim 12, wherein the first multi-window motion analyzer resource further applies a second-sized analyzer window to detect the first motion.

14. The non-transitory computer readable medium of claim 13, wherein the first multi-window motion analyzer resource derives motion vector information based on the detected first motion.

15. The non-transitory computer readable medium of claim 11, wherein a first-sized analyzer window of the first multi-window motion analyzer resource is sized to analyze a first number of display elements in the current input image frame and wherein a second-sized analyzer window of the first multi-window motion analyzer resource is sized to analyze a second number of display elements in the current input image frame.

16. The non-transitory computer readable medium of claim 15, wherein a total number of display elements in the second-sized analyzer window is less than a total number of display elements in the first-sized analyzer window.

17. The non-transitory computer readable medium of claim 16, wherein the first-sized analyzer window is sized to be a matrix of 24×24 display elements and the second-sized analyzer window is sized to be a matrix of 12×12 display elements.

18. A method comprising:
receiving a sequence of image frames including a current input image frame and a next input image frame, the next input image frame received in the sequence after the current input image frame;
to denoise the current input image frame into a modified current input image frame: i) implementing a first multi-window motion analyzer resource to detect first motion based on a first analysis in which the first multi-window motion analyzer resource analyzes the current input image frame with respect to the next input image frame, the first multi-window motion analyzer resource applying multiple different sized analyzer windows to detect the first motion; and ii) implementing a second multi-window motion analyzer resource to detect second motion based on a second analysis in which the second multi-window motion analyzer resource analyzes the current input image frame and a previously outputted image frame, the second multi-window motion analyzer resource applying multiple different sized analyzer windows to detect the second motion;
outputting the modified current input image frame; and
storing the modified current input image frame in a frame buffer.

19. The method as in claim 18, wherein the previously outputted image frame is a previously denoised image frame produced via operations performed by the first multi-window motion analyzer resource and the second multi-window motion analyzer resource.

\* \* \* \* \*